INVENTORS
JEAN CARON
FIRMIN BIGO
BY
AGENT

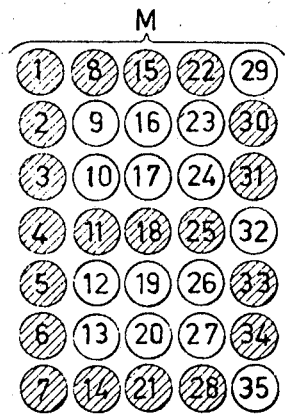
FIG.1A
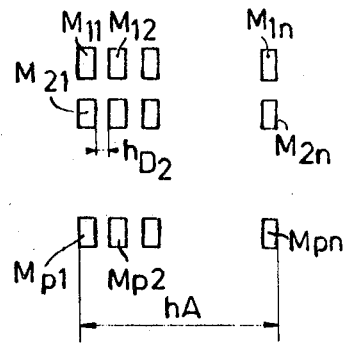
FIG.1B
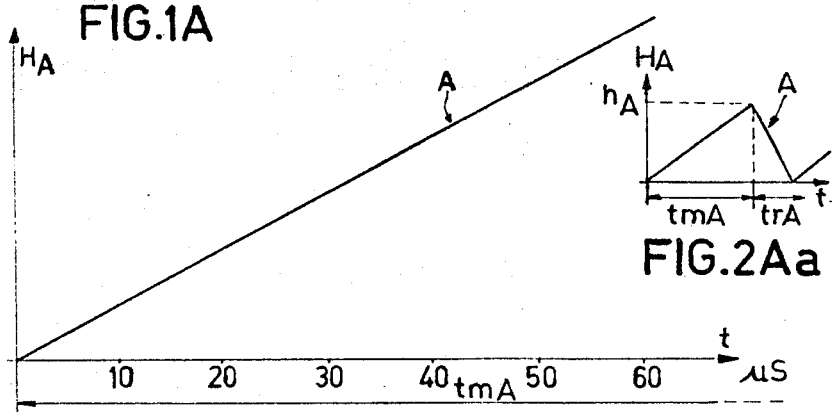
FIG.2A
FIG.2Aa
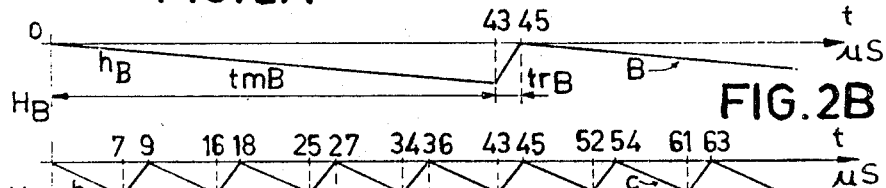
FIG.2B
FIG.2C
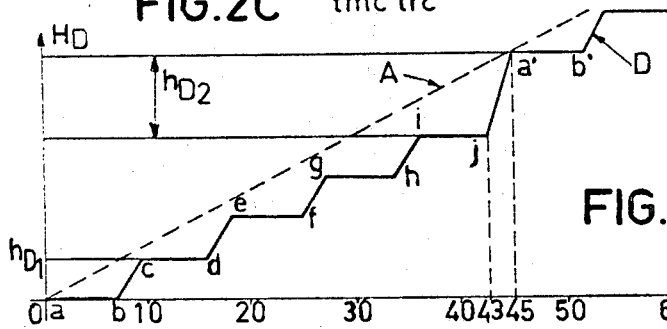
FIG.2D
INVENTORS
JEAN CARON
FIRMIN BIGO
BY
AGENT June 10, 1969
J. CARON ET AL
3,449,620
DEVICE FOR REPRODUCING INFORMATION ON THE
SCREEN OF A CATHODE-RAY TUBE
Filed April 19, 1966
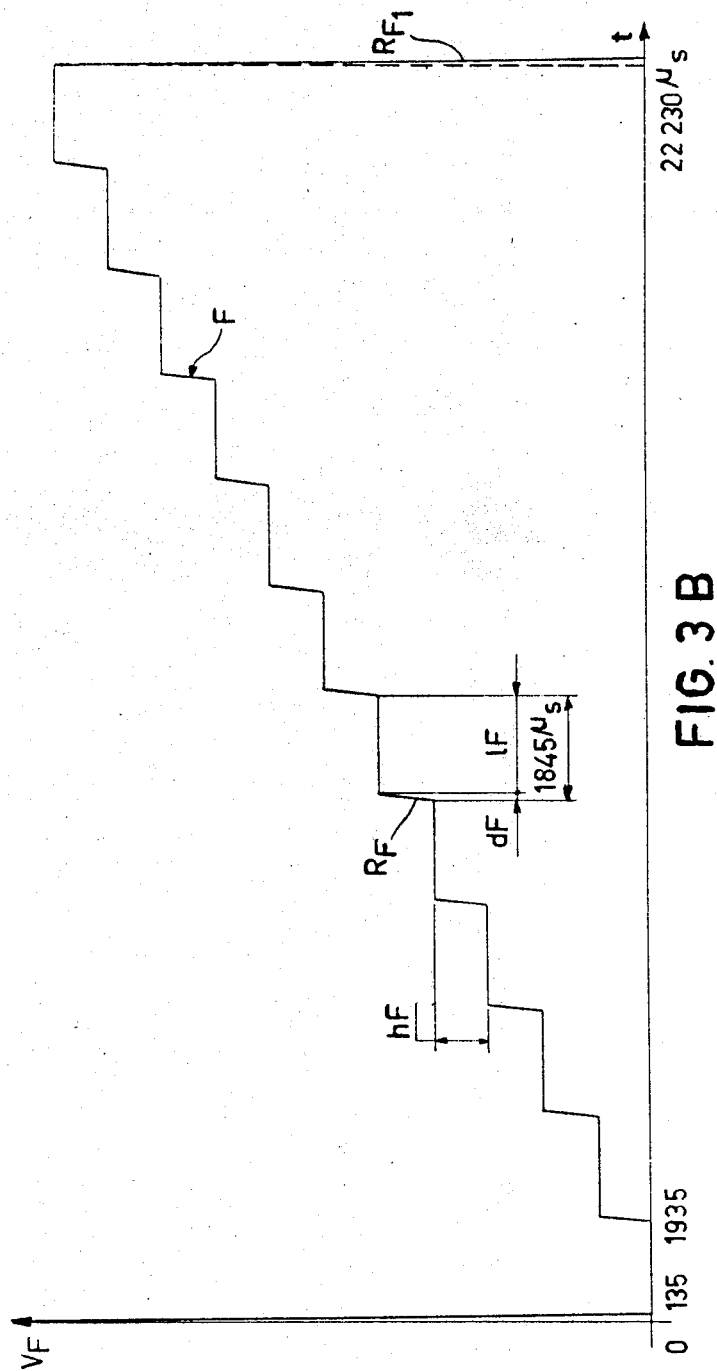
INVENTORS
JEAN CARON
FIRMIN BIGO
BY
AGENT

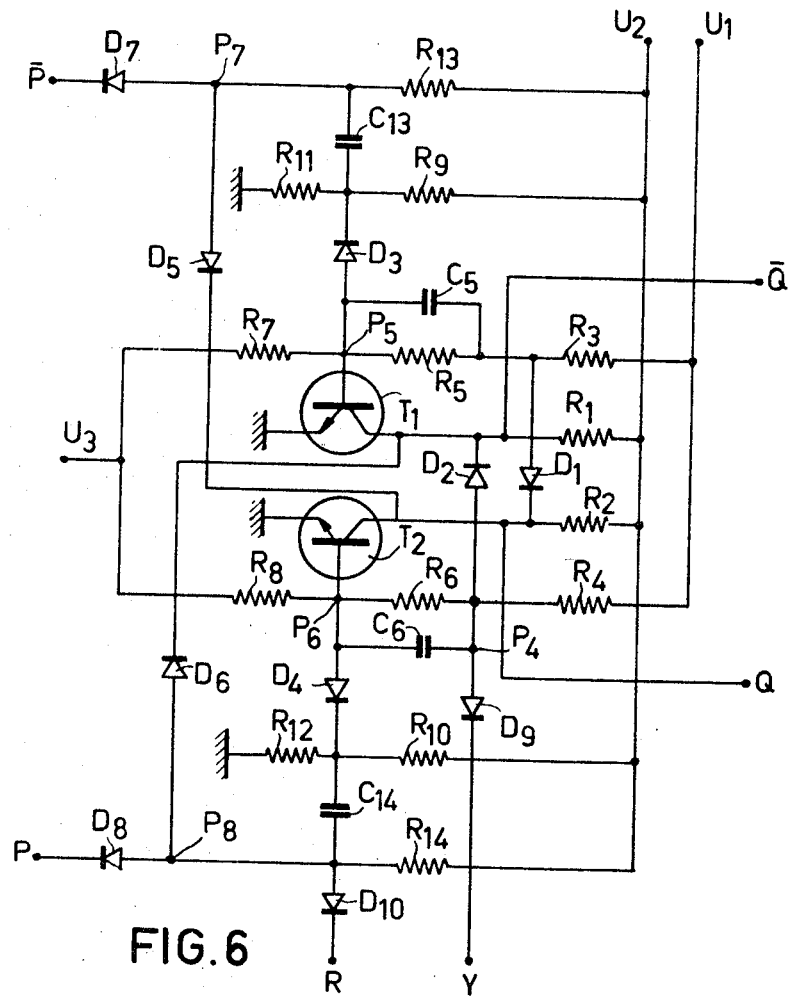
FIG.6
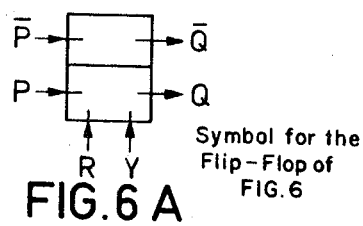
Symbol for the
Flip-Flop of
FIG.6
FIG.6A

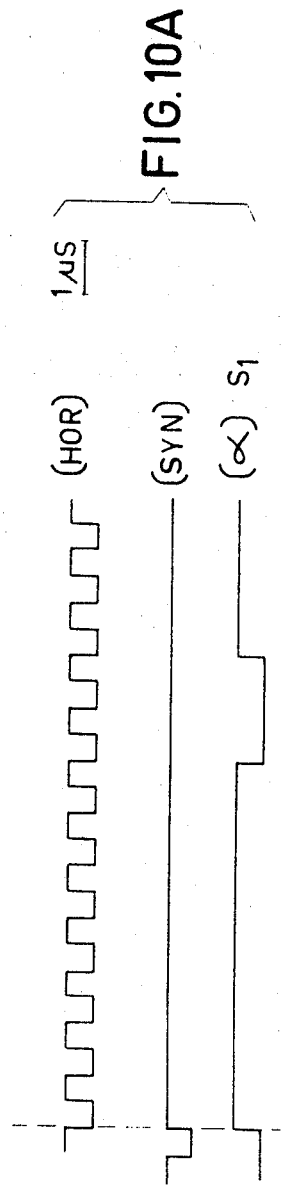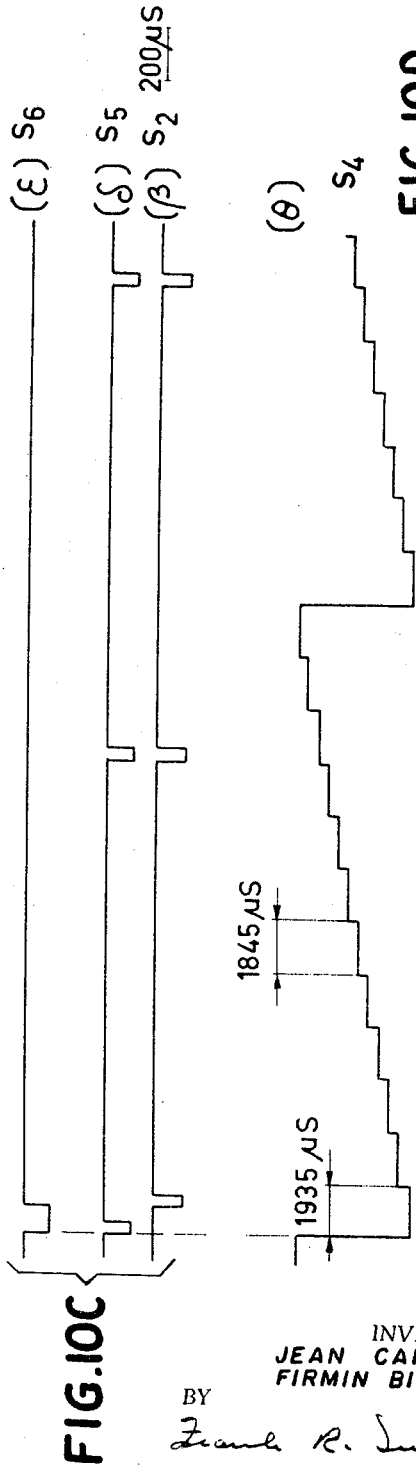

INVENTORS
JEAN CARON
FIRMIN BIGO
BY
Frank R. Trifari
AGENT

INVENTORS
JEAN CARON
FIRMIN BIGO
BY
AGENT

INVENTORS
JEAN CARON
FIRMIN BIGO
BY
AGENT

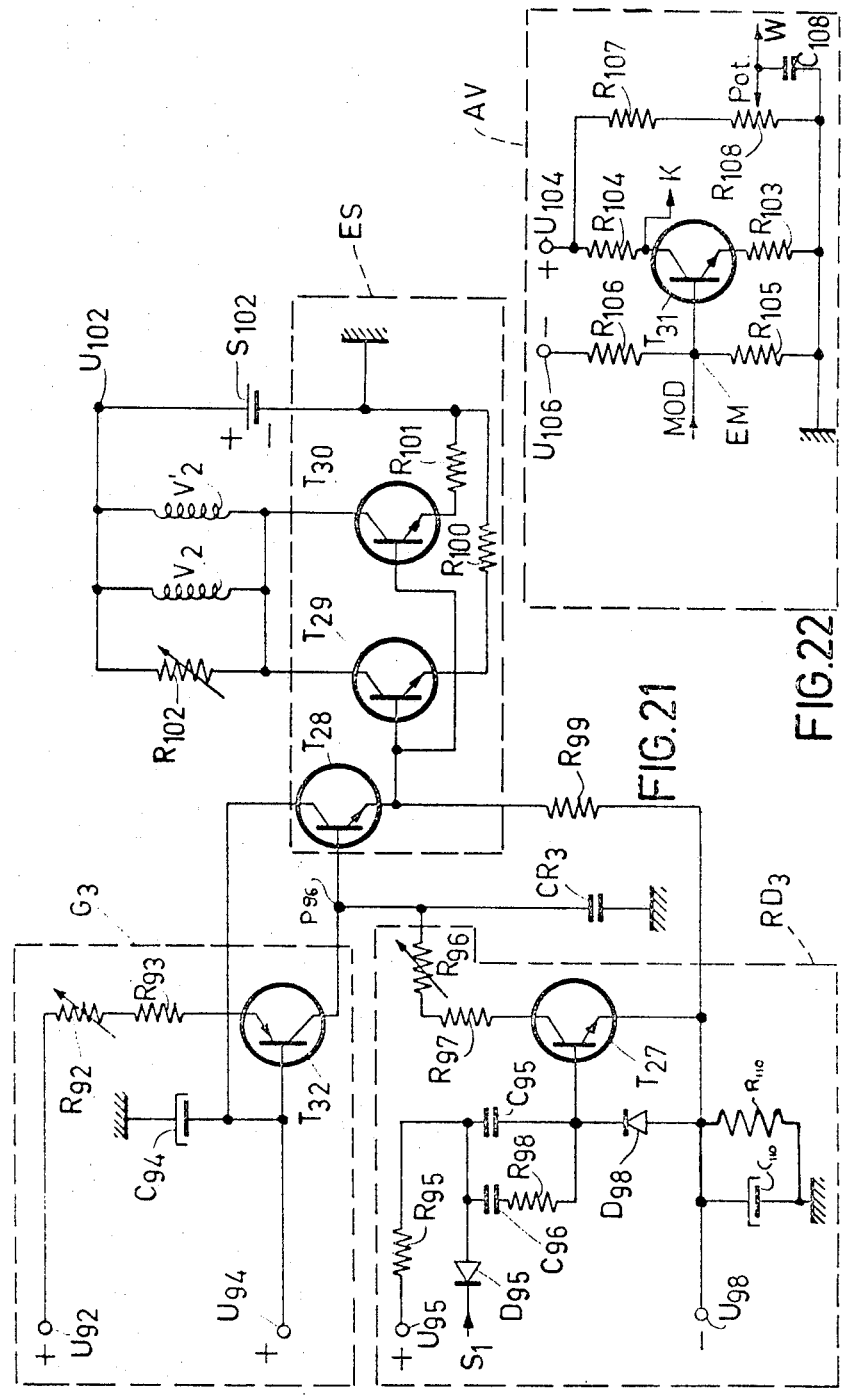

United States Patent Office 3,449,620
Patented June 10, 1969

3,449,620
DEVICE FOR REPRODUCING INFORMATION ON THE SCREEN OF A CATHODE-RAY TUBE
Jean Caron and Firmin Bigo, Evreux, Eure, France, assignors, by mesne assignments, to U.S. Philips Corporation, New York, N.Y., a corporation of Delaware
Filed Apr. 19, 1966, Ser. No. 543,561
Claims priority, application France, May 28, 1965, 18,746
Int. Cl. H01j 29/70
U.S. Cl. 315—22          17 Claims

ABSTRACT OF THE DISCLOSURE

An alpha numerical display system for displaying rows and columns of symbols, in which the symbols are scanned in sequence in each row, the rows are scanned in sequence, and each symbol is scanned in a series of vertical scans before the next symbol is scanned. Each symbol has a plurality of points that are intensified in a predetermined sequence to provide a desired illuminated symbol. The horizontal scan wave is the sum of three sawtooth waves: the first of which has an amplitude corresponding to the length of a row symbols and a trace time corresponding to the time required to scan a row of symbols, the second of which has an amplitude corresponding to the width of a symbol and the adjoining space and a trace time corresponding to the time required to scan a symbol, and the third of which has an amplitude corresponding to the distance between adjacent horizontal points of a symbol and a trace time corresponding to the time for scanning one vertical line of a symbol. The vertical scan wave is the sum of a sawtooth signal having an amplitude corresponding to the height of a symbol and having a trace time corresponding to the time required to vertically scan a symbol, and a stepwave signal having a step height corresponding to the interval between rows and a step width corresponding the time required to scan a row of symbols.

---

The invention relates to a device for reproducing information on the screen of a cathode-ray tube, said information consisting of symbols defined by a characteristic train of electric modulation signals supplied from apparatus beyond the device and modulating the electron beam in intensity so that given points of a matrix luminesce, said point being arranged on lines lying one above the other and said matrices being arranged in at least one row, the spot of the electron beam scanning consecutively one column after the other of each matrix by the combined effect of the horizontal and vertical deflection members.

It is known that for the transfer, processing or storing of information (α numerical data) it is common practice to convert the information into coded electric signals, which are subjected to various appropriate treatments, particularly in devices such as computers.

After the process the information available in the form of electric signals at the output of said devices is given as the result. For direct use said electric signals have to be converted in turn into symbols, characters (α-data) and digits (numerical data).

It has been proposed to render such information visible on the screen of a cathode-ray tube. For this purpose each symbol is characterized by a train of consecutive electric signals and on the screen each symbol is formed by the luminescence of given appropriate points of an array of points (or matrix), which luminescence is produced by the modulation of the electron beam by each of said signals. Inside the matrix the points are arranged in lines and columns, whereas the matrices themselves are arranged in rows one below the other.

By synchronising said train of signals and by scanning with the aid of the electron beam sequences of symbols can be formed on the screen, when the spot scans consecutively all matrices of the screen in the correct order.

The present invention relates to a device of this kind, particularly to a device of displaying the information stored in a computer. This device is characterized in that the horizontal deflection member is controlled by a combination of sawtooth signals comprising at least one first signal having an amplitude corresponding to the length of one row of matrices and a tracing time corresponding to the period in which the spot has to scan all matrices of one row, a second signal having an amplitude corresponding to the number of intervals between the columns of adjacent points of the same matrix and to the interval between two consecutive matrices of the same row, and having a tracing time corresponding to the period in which the beam scans one matrix, and a third signal having an amplitude corresponding to the interval between two columns of points of one matrix and having a tracing time corresponding to the period in which a column of points is traversed. The retracing times of the second signal and of the third signal are equal to each other and correspond each to the periods in which the beam changes over in one matrix from one column of points to the other column, the front edges of these second and third signals being such that their sum is equal to but opposite the front edge of the first-mentioned signal. The vertical deflection member is controlled by at least one sawtooth signal having an amplitude corresponding to the scan of one column of points of one matrix and having a tracing time corresponding to the period in which the beam covers a column of points and a retracing time during which the beam passes from one column to the other and from one matrix to the other in the same row, said sawtooth signal having exactly the same repetition frequency and the same phase as the third sawtooth signal of the horizontal deflection.

When the electron beam has to scan various rows of matrices, the vertical deflection member is, in addition, controlled by a step signal, the height of each step equal to the interval between two rows of matrices and the width of each step being equal to the time required by the beam to cover all points of a row of matrices. In this case the retracing time of the first sawtooth signal is equal to the time required by the beam for changing over from the end of one row of matrices to the beginning of the next row of matrices.

The horizontal and vertical deflection members are preferably magnetically controlled and comprise each two sets of coils. The first sawtooth signal is fed to one of the sets of coils of the device for the horizontal deflection of the beam, while an appropriate combination of the second signal and the third signal is fed to the other set of coils. In the same manner each of the two vertical deflection signals is fed to a set of corresponding coils.

The analysis of the sawtooth deflection signals of the desired amplitude and repetition frequency provides signals producing deflections of high amplitudes at low or average repetition frequencies and signals producing deflections of small amplitude at high repetition frequencies.

Splitting up into the combinations of horizontal and vertical members with the associated coils permits of adapting the electrical properties of each combination, for example the deflection sensitivity and the associated inductance to the required frequency and amplitude.

The electrical current characterized by a low or average repetition frequency and a large amplitude is preferably to an assembly having a great deflection sensitivity and a comparatively high natural inductance. The electric currents characterized by a high repetition frequency and a low amplitude are supplied to an assembly having a low deflection sensitivity and a comparatively low natural inductance.

The sawtooth signals are preferably obtained by charging a capacitor by a constant current and by discharging it by means of a suitable circuit.

In order to obtain synchronism between various signals for deflecting the electron beam and the modulation signals of the beam, the various discharge circuits are controlled by time-base signals, the time-base circuit itself being controlled by the apparatus beyond the device, for example a computer supplying said modulation signals. One of the time-base circuits supplies directly the step signal for the vertical deflection.

Thus the electron beam scans the points of each symbol in each matrix one column after the other and one matrix after the other in each row and then one row of matrices after the other, the points corresponding to the modulation signals being caused to luminesce.

The invention will be described with reference to the accompanying drawing.

FIGS. 1A and 1B show embodiments of a matrix for displaying a symbol on the screen of a cathode-ray tube and the array of matrices for displaying a series of symbols.

FIGS. 2A, 2B, 2C and 2D show three sawtooth signals for the horizontal scan of the screen and the combination of said signals.

FIG. 2Aa shows on a diminished scale the curve of FIG. 2A.

FIGS. 3A and 3B show each one signal for the vertical scan of the screen.

Figure 4:
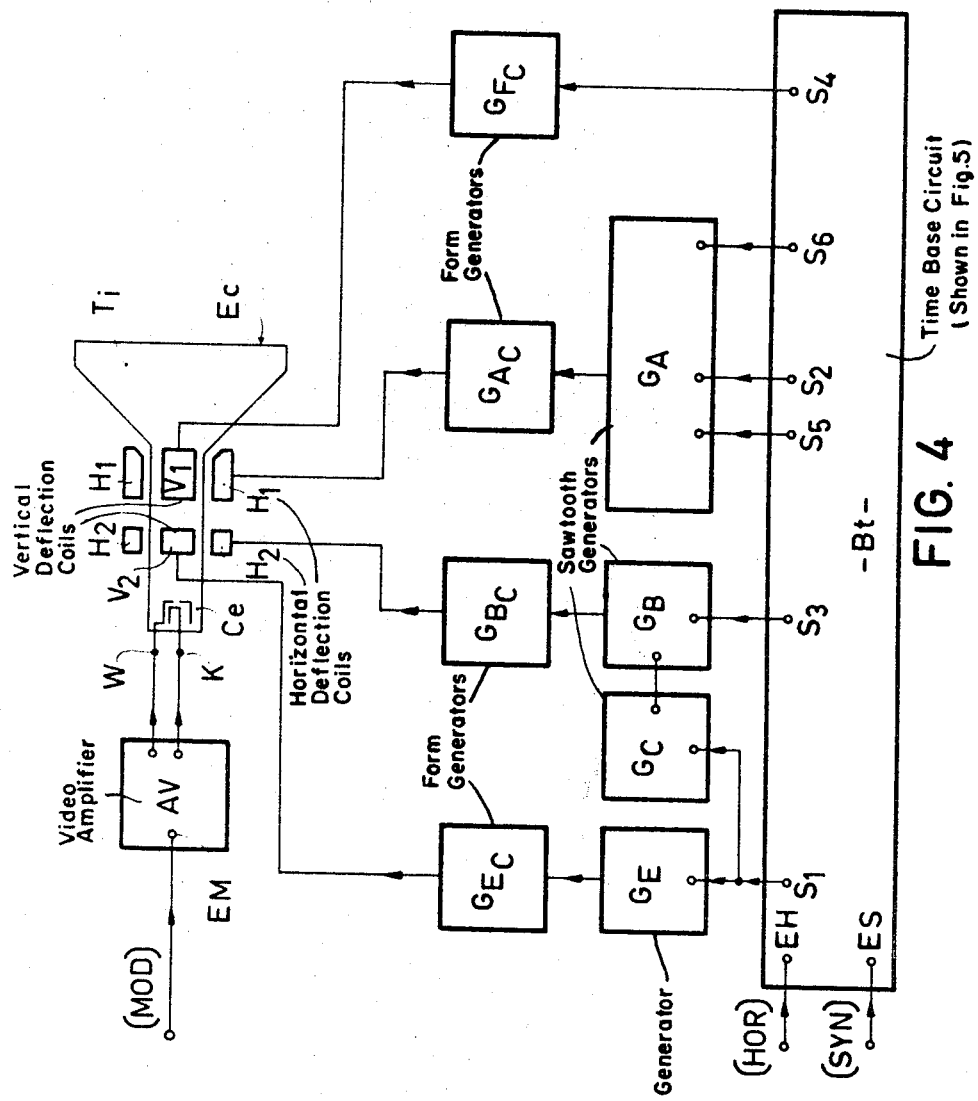

FIG. 4 shows a block diagram of a device according to the invention.

Figure 5:
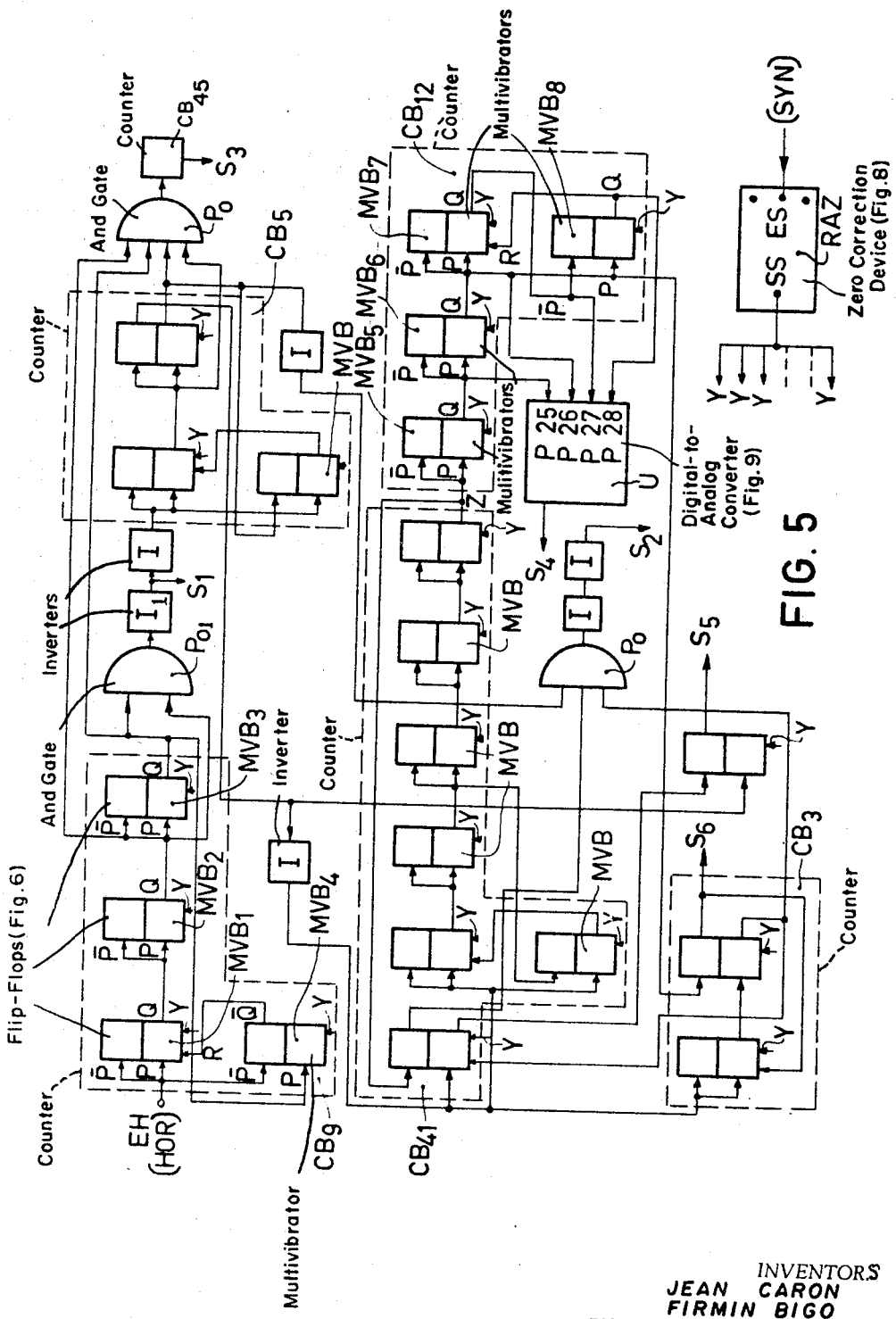

FIG. 5 shows a block diagram of the time-base circuit controlling the sawtooth generators.

FIGS. 6, 6A, 7, 8 and 9 show the schematic diagram of a bistable flip-flop circuit, the symbol of a flip-flop circuit, and the schematic diagrams of an inverting circuit ET, of a zero-point correction member and of the digital analogue converter respectively forming part of the time-base circuit of FIG. 5.

FIGS. 10A–10D show diagrams indicating the waveform of the signals at different points of the time-base circuit of FIG. 5.

Figure 11:
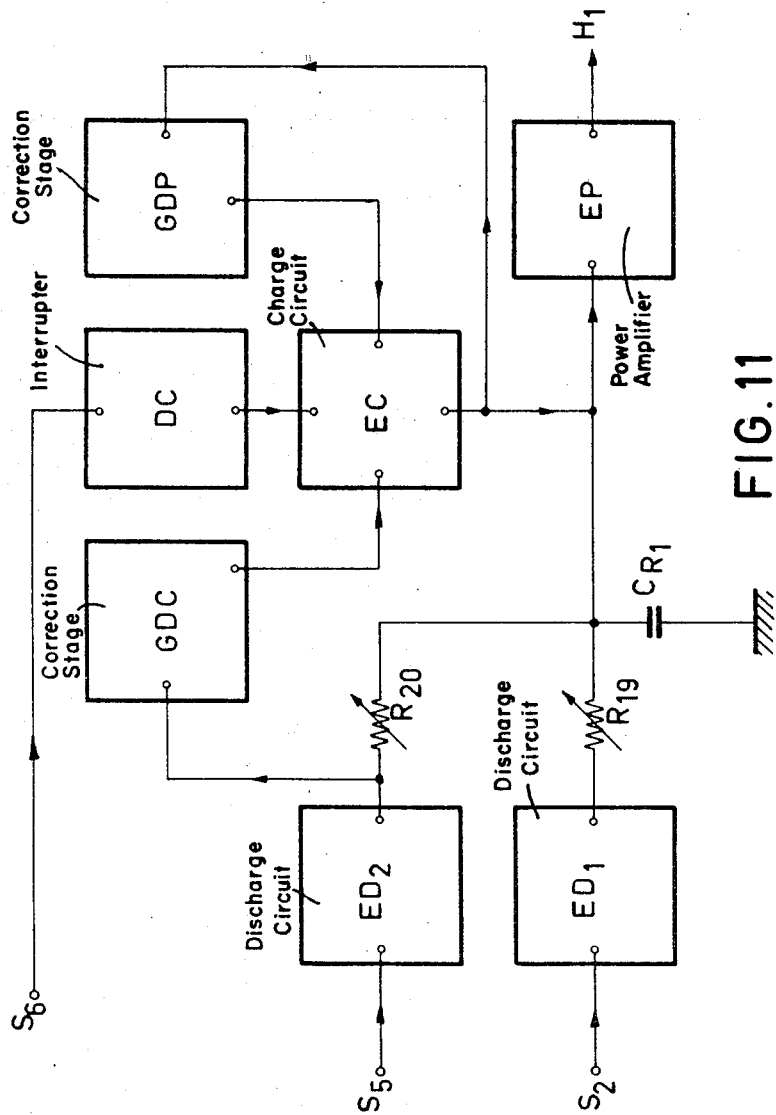

FIG. 11 is a block diagram of the control-circuit of the first set of coils for horizontal deflection.

Figure 12:
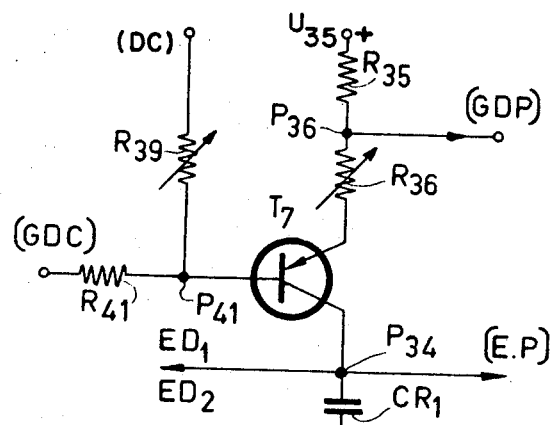

FIG. 12 shows a diagram for given operations of the control-circuit of the first set of horizontal deflection coils, the block diagram of which is shown in FIG. 11.

Figure 13:
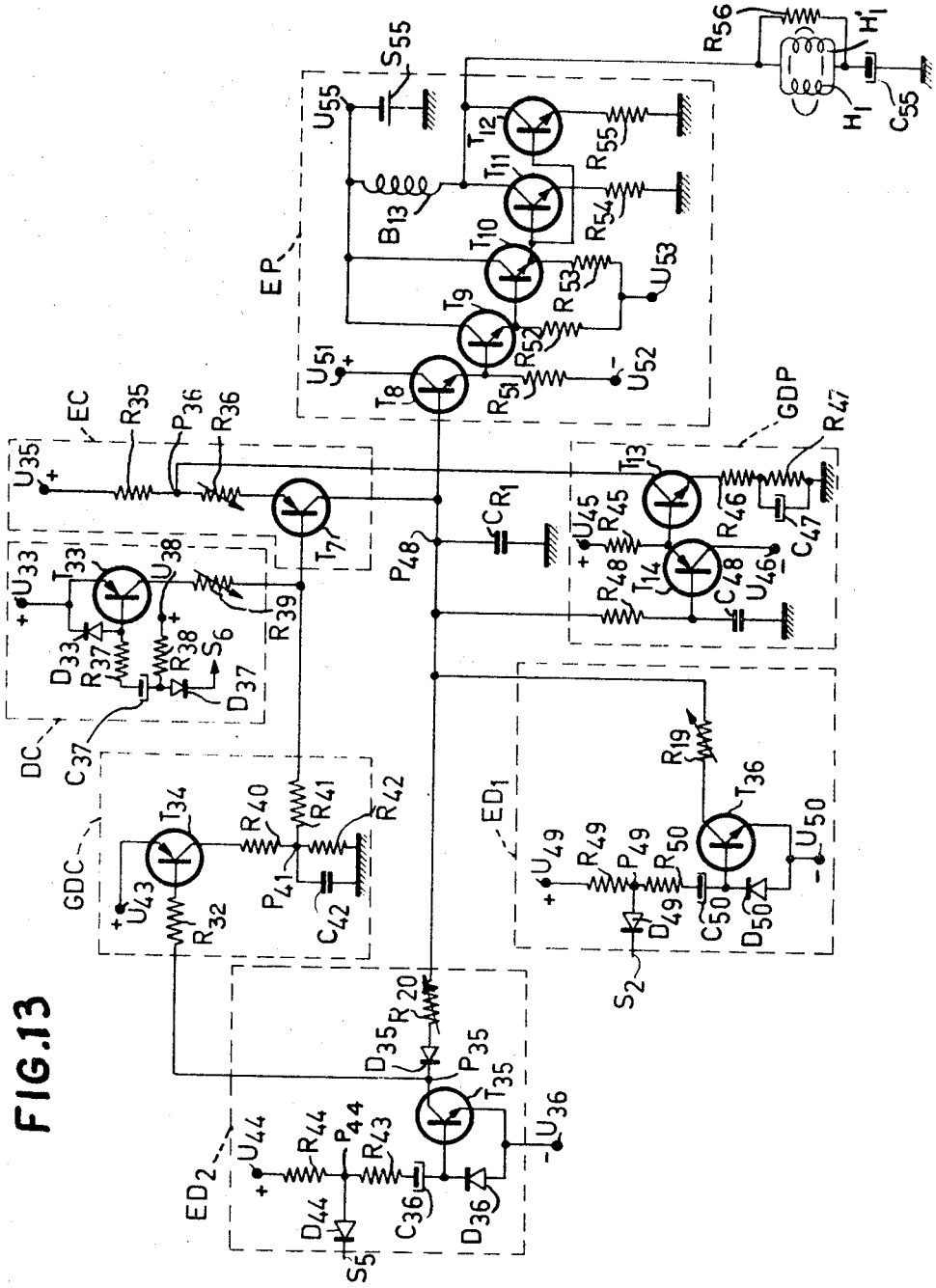

FIG. 13 shows a schematic diagram similar to that of FIG. 11.

Figure 14:
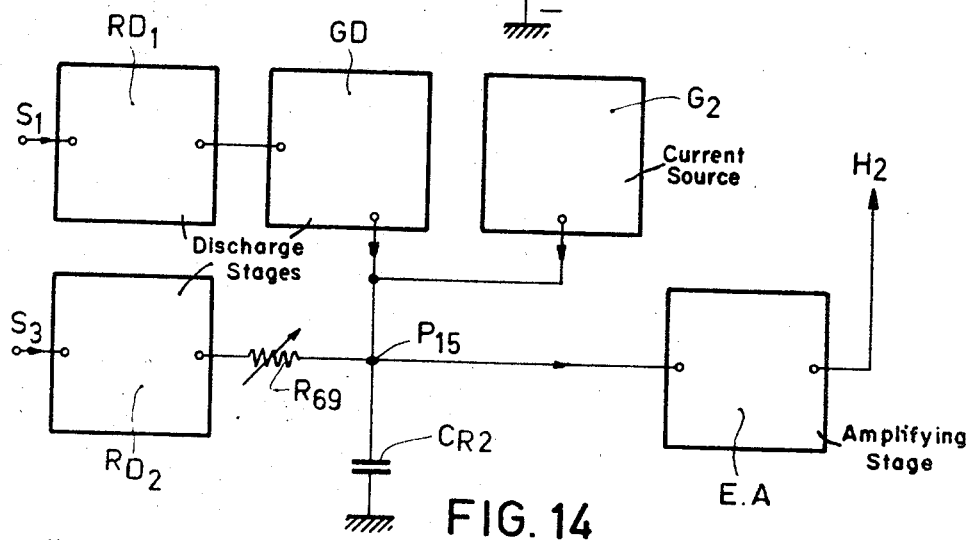

FIG. 14 is a block diagram of the control-circuit of the second set of horizontal deflection coils.

Figure 15:
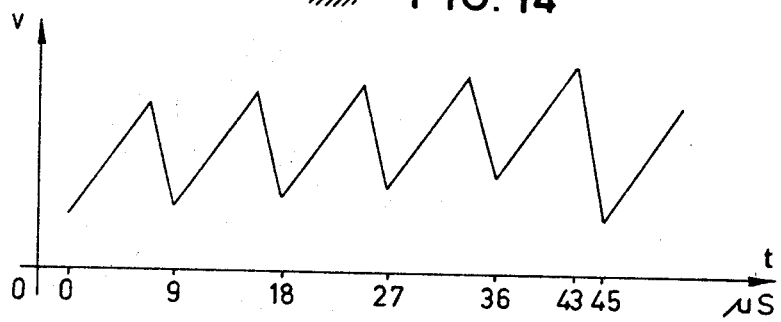

FIG. 15 is a time diagram of the voltage at the terminals of the buffer capacitor of the circuit of FIG. 14.

Figure 16:
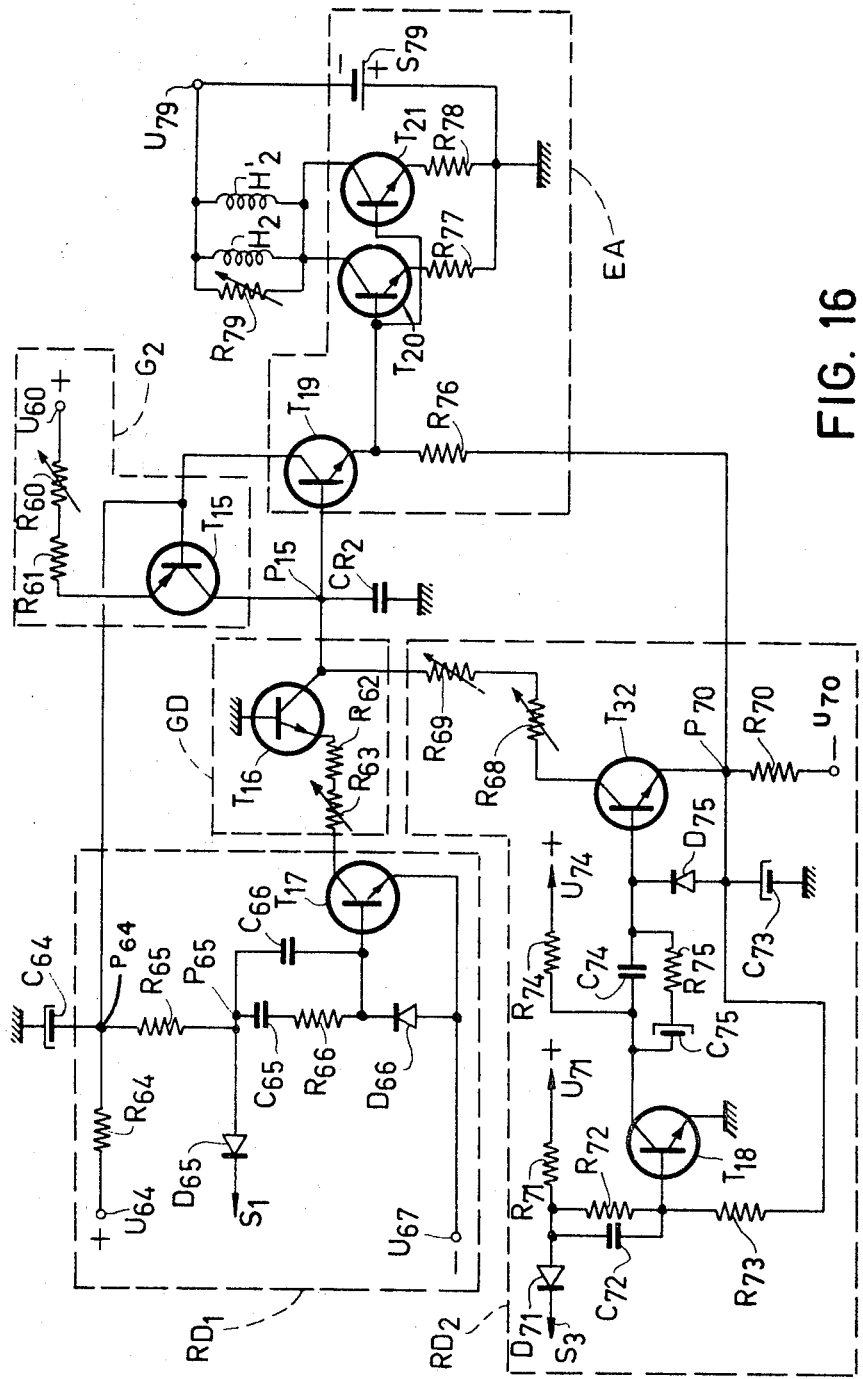

FIG. 16 is a schematic diagram of the control-circuit of the second set of horizontal deflection coils.

Figure 17:
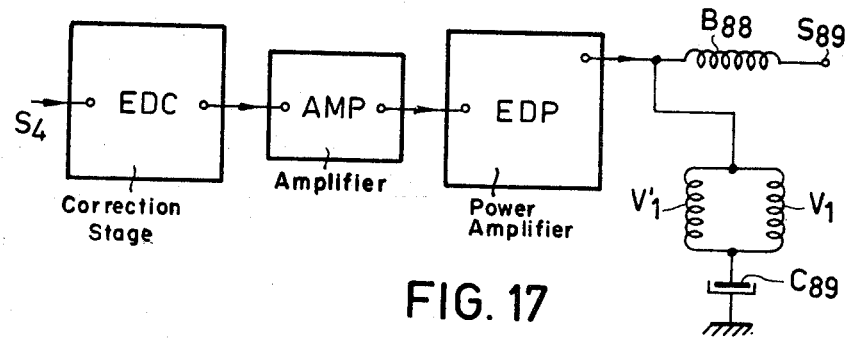

FIG. 17 is a block diagram of the control-circuit of the first set of vertical deflection coils.

Figures 18A, 18B, 18C:
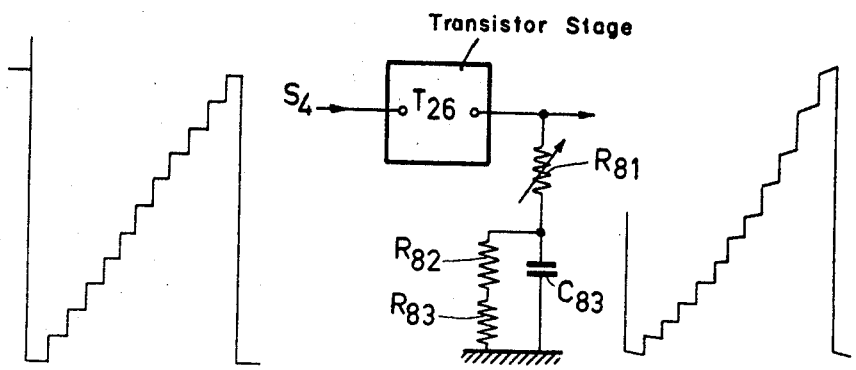

FIGS. 18A, 18B and 18C show a correction member for the voltage applied to the first set of vertical deflection coils and the waveform of said voltage at the input and the output of the correction member.

Figure 19:
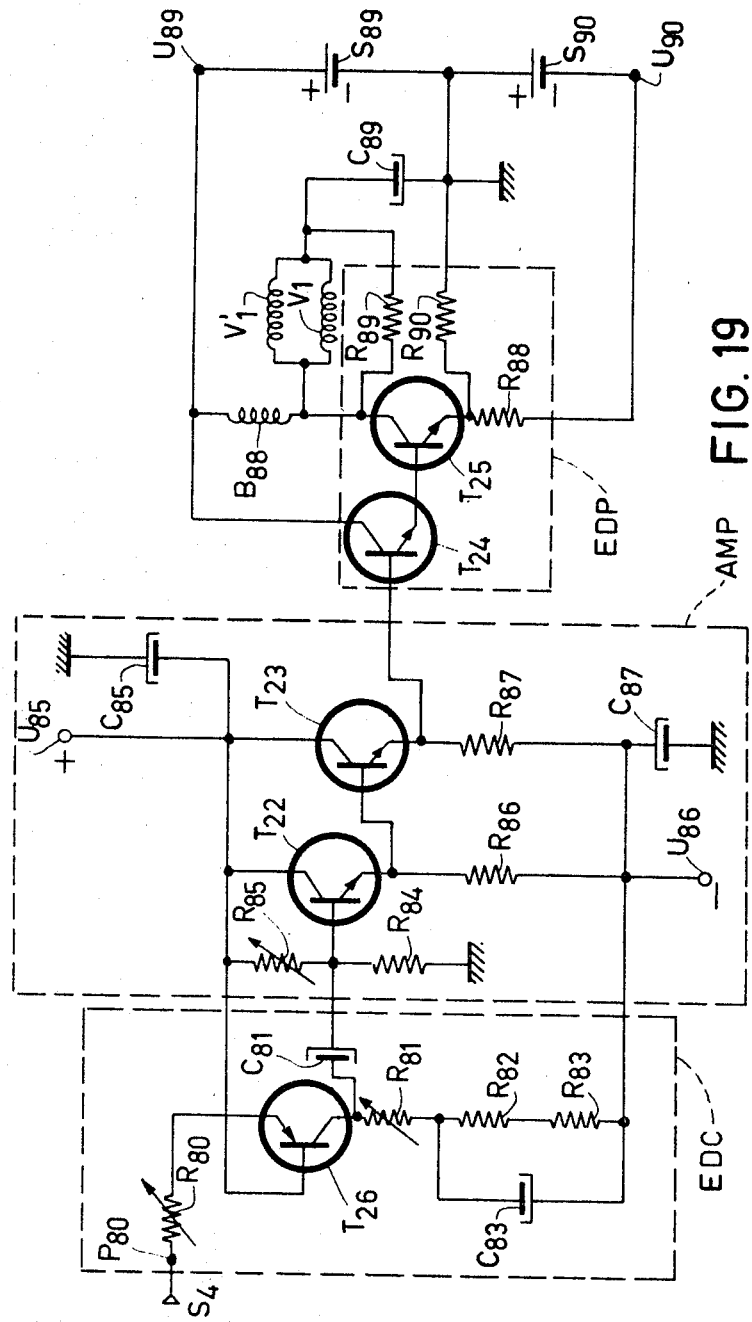

FIG. 19 is a schematic diagram of the circuit of FIG. 17.

Figure 20:
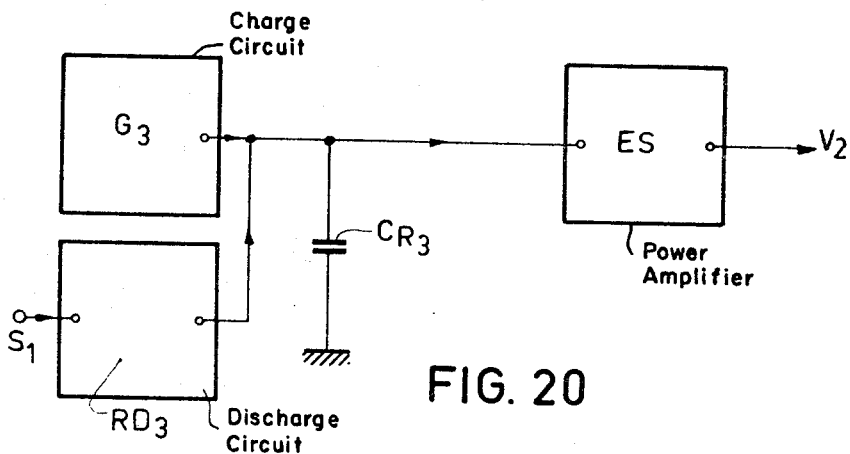

FIG. 20 is a block diagram of the control-circuit of the second vertical deflection coils.

FIG. 21 is a schematic diagram of the circuit of FIG. 20.

FIG. 22 shows an embodiment of an amplifier supplying the modulation signals to the cathode of the cathode-ray tube.

For the sake of clarity a practical embodiment will be described; the data indicated have to be taken by way of example.

FIGS. 1A and 1B show how symbols, for example characters or digits can be displayed on the screen of a cathode-ray tube, the electron beam intensity of which is varied by modulation signals.

FIG. 1A shows a matrix M of points to be scanned by the electron beam for displaying one of the symbols. In the embodiment shown said matrix comprises 35 points (5 columns and 7 lines), scanned by the beam in the given order. The beam thus scans one column after the other, starting at the left-hand top. Each of the points is normally dark and it luminesces when a modulation signal is fed to the electron beam at the instant when the spot passes the point concerned.

In order to write for example the character B (ee FIG. 1A) the modulation signals have to be fed to the electron beam when it strikes the points 1, 2, 3, 4, 5, 6, 7, 8, 11, 14, 15, 18, 21, 22, 25, 28, 30, 31, 33 and 34.

Such matrices are, of course, imaginary arrays; they appear only in the form of luminescing dots on the screen, when scanned by the electron beam.

It will be seen that a given number of identical matrices may be combined in $p$ rows and $n$ columns (see FIG. 1B) in order to write a series of symbols (for example a text), in which the number of the modulation signals and their distribution are different for two different symbols. In FIG. 1B each matrix M has the number of the row and that of the column.

The electron beam has to cover a composite path on the screen. It starts at point 1 of the first matrix M11 of the first row and follows the first column of this matrix to point 7, after which it passes to point 8, the first point of the second column, which is covered to point 14 and so on to point 35. The beam then passes to point 1 of the matrix M12 which is scanned in the said manner and this applies to all matrices of the first row up to point 35 of the matric M1n. The beam then jumps to point 1 of the first matrix M21 of the second row, which is scanned in the manner described above; all rows of matrices are thus traversed to point 35 of the matrix M$pn$, after which the beam returns to point 1 of the matrix M11.

According to the invention this scanning mode is obtained by means of the combination of the horizontal sawtooth deflections $H_A$, $H_B$ or $H_C$, shown in the same scale in FIGS. 2A, 2B and 2C respectively and with the vertical deflections $V_E$ and $V_F$, shown in FIG. 3 on different scales.

FIG. 2A shows the first part of a sawtooth signal A, which is shown on a smaller scale in FIG. 2Aa; the tracing time $t_{mA}$ thereof is equal to the period of time required by the beam to scan the length $h_A$ of a row of matrices M (see FIG. 1B) and the retracing time $t_{rA}$ is equal to the time required by the beam for passing over from the end of one row of matrices to the beginning of the next row. In order that the beam can scan the whole length of a row of matrices, the amplitude of the signal A is furthermore equal to $h_A$ (see FIG. 2Aa).

If, as stated above, the matrices are each formed by 5 columns of 7 points and if each row comprises 40 matrices, the scanning time for one column of points in one matrix may be 7 $\mu$sec and the transitional time between two consecutive columns and two consecutive matrices may be 2 $\mu$sec. The scanning time of one matrix is thus $5 \times (7+2) = 45$ $\mu$sec, including the interval of time between the matrices. Under these conditions of scanning time of a row, that is to say the tracing time $t_{mA}$ of the sawtooth signal A is $45 \times 40 = 1800$ $\mu$sec. The time required by the beam to pass over from the end of one row of matrices to the beginning of the next row may thus have the value of 45 $\mu$sec so that the retracing time $t_{rA}$ of each sawtooth signal A is 45 $\mu$sec and the overall time in this particular case 1845 $\mu$sec.

The deflection $H_A$ can be obtained by means of a signal formed by a train of sawtooth pulses A, fed to a magnetic deflection member. The displacement of an electron is proportional to the strength of the associated magnetic field, which itself is proportional to the current supplied to the deflection member. The deflection $H_A$ can thus be obtained by means of the sawtooth current signal A. This also applies to the other deflections of the beam.

The deflection $H_A$ has superimposed on it the combination of two deflections $H_B$ and $H_C$, which are produced by the sawtooth signals B and C illustrated in FIGS. 2B and 2C. The retracing time $t_{rB}$ of the signal B is equal to the interval between two consecutive matrices, for example, to 2 $\mu$sec. The tracing time $t_{mB}$ is the time necessary for scanning one matrix, for example, 45−2=43 $\mu$sec. The amplitude $h_B$ of the signal B determines the interval between two consecutive matrices.

The deflection $H_C$ is obtained by the signal C, having a retracing time $t_{rC}$ equal to the interval between one column of points and the next column of points in the same matrix; this time is indicated by $t_{rB}$ and has a duration of, for example, 2 $\mu$sec. The tracing time $t_{mC}$ of the signal C has a duration equal to the scanning period of one column, for example, 7 $\mu$sec. The amplitude $h_C$ of the signal C partially determines the interval between two consecutive columns of the same matrix.

The superimposition of the three signals A, B and C results in the curve D of the horizontal deflection $H_D$, shown in FIG. 2D. Since the values of $h_B$, $h_C$, $t_{mB}$ and $t_{mC}$ are chosen so that the sum of the rear edges of the signals B and C is equal to the front edge of the signal A, the deflection $H_D$ is characterized by a sequence of steps having a duration of 7$\mu$sec, during which the beam is not displaced in the horizontal direction, after which the beam performs a jump of a duration of 2 $\mu$sec. During these jumps the beam is deflected either in the same matrix (bc, de, fg, hi, . . .) from one column to the other, or from one matrix to the other (j'a', . . .). During the period of 7 $\mu$sec (steps ab, cd, ef, gh, ij, a'b', . . .), during which the beam is not deflected horizontally, the beam can scan a column in a vertical sense. The interval between two columns of one matrix is equal to $h_{D1}$ and the interval between two matrices is equal to $h_{D2}$; the point $a'$, like the point $a$ is located on the sawtooth signal A. The same scanning process restarts at $a'$ and goes on until the end of a row.

For the beam scan of each column this horizontal deflection $H_D$ has superimposed on it a vertical deflection $V_E$ (FIG. 3A), which is obtained by means of a sawtooth current signal E. The amplitude $v_E$ thereof is equal to the height of one matrix M. Moreover, the tracing time $t_{mE}$ is equal to the scanning time of a column, for example 7 $\mu$sec, that is to say the period of one step of the signal D. The retracing time $t_{rE}$ must be equal to the interval between the columns or between the matrices, for example 2 $\mu$sec, that is to say the period of one jump of the signal D.

By the combination of the deflection $H_D$ and $V_E$ the beam is capable of scanning any point of all matrices of one row. For the transition of the last matrix of one row to the first matrix of the next row the beam is furthermore deflected vertically ($V_F$; FIG. 3B). This deflection is obtained with the aid of a signal F, formed by a step current, each step of which has a duration $1_F$ equal to the scanning period for one row of matrices, here for example 1800 $\mu$sec.; the height of the steps may be equal to the interval between two consecutive rows of matrices. The end of one step is joined at the beginning of the next one by a rectilinear part of the signal $R_F$ of a duration $d_F$ equal to the time required by the beam for passing from one row of matrices to the next one, for example 45 $\mu$sec., which corresponds to the jump between two steps. The overall duration of one step $1_F$ and a jump $R_F$ of the signal F is therefore 1845 $\mu$sec.

When the beam has scanned the last matrix $M_{pn}$ (FIG. 1B) it has to return to the matrix M11. The period of such a flyback exceeds the interval between two consecutive rows of matrices and it is assumed here to be 135 $\mu$sec. Since twelve rows of matrices are provided, the signal F must have twelve steps and eleven jumps $R_F$.

The overall period of the signal F, inclusive of the retracing time of 135 $\mu$sec., is therefore $$12 \times 1800 + 11 \times 45 + 135 = 22,230$$

$\mu$sec. In order to reset the beam from the end of the matrix $M_{pn}$ in the horizontal direction and in the vertical direction with the same speed for scanning the matrix M11, the retracing time $t_{rA}$ of the sawtooth signal A is also chosen to be 135 $\mu$sec., which is therefore the duration of the rectilinear part of the signal F. The value of 135 $\mu$sec. is chosen in connection with the fact that this is a multiple of 9 $\mu$sec., which is the period of time of the signals C and E and a multiple of 45 $\mu$sec., the period of the signal B, so that at the end of the retracing time of the signals A and F the signals B, C and E are at the beginning of their tracing times $t_{mB}$, $t_{mC}$ and $t_{mE}$ respectively.

FIG. 4 shows diagrammatically how the various signals of FIGS. 2 and 3 are obtained and combined to cause the beam to scan the screen $E_c$ of a display tube $T_i$.

The tube $T_i$ comprises four sets of coils of a type known in television technique for the deflection of the electron beam. Two of these sets $H_1$ and $H_2$ serve for the horizontal deflection and two further sets $V_1$ and $V_2$ serve for the vertical deflection.

The set $H_1$ receives a signal from a sawtooth generator $G_A$ and a form generator $G_{AC}$; this signal A is shown in FIG. 2A. The set $H_2$ receives a combination of signals B and C, shown in FIGS. 2B and 2C, from sawtooth generators $G_B$ and $G_C$ and a form generator $G_{BC}$.

The set $V_2$ receives a signal E of FIG. 3A from a sawtooth generator $G_E$ and a form generator $G_{EC}$. As will be explained more fully hereinafter, the form generators $G_{AC}$, $G_{BC}$, and $G_{EC}$ are especially intended to form the sawtooth signals developed by generators $G_A$, $G_B$ and $G_C$ as far as linearity and special forms during retrace time is concerned. It is also possible to insert desired corrections in the original sawtooth signals with the aid of these form generators.

The generators $G_A$, $G_B$, $G_C$ and $G_E$ are connected to the outputs $S_2$, $S_5$, $S_6$, $S_3$ and $S_1$ respectively (see FIG. 4) of a time-base circuit $B_t$ for the control in synchronism. The output $S_4$ of the time-base circuit is connected through a form generator $G_{FC}$ to the set $V_1$ in order to obtain the step signal F of FIG. 3B.

The time-base circuit $B_t$ is controlled by signals, for example, from a computer having the information in its store. The computer supplies its signals to the inputs $E_H$, $E_S$ of the time-base circuit $B_t$. These signals are reference or clock signals (HOR) and field synchronising signals (SYN) preceding the signal (HOR) with each field. In this embodiment the signal (HOR) is a square-wave signal having a repetition frequency of 1 mc./s.; the square waves have a duration of 0.5 $\mu$sec. and an interval also of 0.5 $\mu$sec. (see FIG. 10A).

The computer also transmits modulation signals (MOD) via the input $E_M$ to the electron gun $C_e$ of the tube $T_i$ through a video amplifier AV, the diagram of which is shown in FIG. 22.

The block diagram of the time-base circuit $B_t$ is shown in FIG. 5. It comprises bistable flip-flops interconnected so that they form counters $CB_3$, $CB_5$, $CB_9$, $CB_{12}$ and $CB_{41}$, which divide by 3, 5, 9, 12 and 41 respectively. These numbers depend upon the values chosen in this embodiment. In another embodiment said numbers may be different.

It is known that a bistable flip-flop forms a divide-by-2 counter, which means that at the output the circuit provides a single pulse for every two pulses fed to its input; $k$ stepwise connected bistable flip-flops thus form a divide-by-$2^k$ counter. In order to form counters having a denominator unequal to the $k^{th}$ power of 2 use has to be made of known feedbacks. For example, in order to form the divide-by-9 counter, the input of which receives the signal (HOR), three bistable flip-flops $MVB_1$, $MVB_2$ and MVB$_3$ are connected stepwise (forming a counter dividing by $2^3=8$), whilst the output Q of MVB$_3$ is connected to an input P of a fourth flip-flop MVB$_4$, the output $\overline{Q}$ of which is connected to the input R of MVB$_1$, whereas a further input $\overline{P}$ of MVB$_4$ receives the signal (HOR). With such a feedback loop, comprising the flip-flop MVB$_4$, there is obtained one pulse at the output S$_1$ of the inverting element I$_1$ for nine pulses (or square waves) of the signal (HOR) applied to E$_H$. The element I$_1$ is connected to the output of and-gate PO$_1$. One input of gate PO$_1$ is connected to the inputs P and $\overline{P}$ of the flip-flop MVB$_3$ and the other input and gate PO$_1$ is connected to the output Q of MVB$_3$. The other inverting elements I in FIG. 5 are also provided according to need in the time-base circuit B$_t$.

With the aid of similar couplings other counters can be obtained; for example the counter CB$_{41}$ is obtained by means of a counter comprising six stepwise connected multivibrators which provide without the need for further means a dividing number of $2^6=64$. A divide-by-45 counter CB$_{45}$ with the output S$_3$ is obtained by the combination of divide-by-9 and divide-by-5 counters.

FIG. 6 shows a practical flip-flop circuit MVB. The collector of the two n-p-n transistors T$_1$, T$_2$ are connected to the positive terminal of the voltage source U$_2$ through the resistors R$_1$ and R$_2$ and the emitters thereof are directly connected to ground, to which also the negative terminals of the sources U$_1$ and U$_2$ are connected. The potential at the base of the transistor T$_1$ is statically determined by the resistor bridge formed by the resistors R$_3$ and R$_5$ in series connection and by the resistor R$_7$. The free end of the resistor R$_3$ is connected to the positive terminal of the voltage source U$_1$ and the free end of the resistor R$_7$ is connected to the negative terminal of the voltage source U$_3$. The base of the transistor T$_1$ is connected to point P$_5$, the junction of the resistors R$_5$ and R$_7$. The potential at the base of the transistor T$_2$, connected to the point P$_6$, is statically determined in symmetry by the resistors R$_4$, R$_6$ and R$_8$. The crossings of the circuits of the collectors and the bases have two semiconductor diodes D$_1$ and D$_2$ and capacitors C$_5$ and C$_6$ are connected in parallel with the two resistors R$_5$ and R$_6$ respectively. The cathodes of the semiconductor diodes D$_3$ and D$_4$, having a selective effect in the transmission of the control-pulses to the bases of the transistors T$_1$ and T$_2$ receive the positive bias voltage U$_2$ via the two resistor bridges formed by R$_9$ and R$_{11}$ and by R$_{10}$ and R$_{12}$ respectively. This positive bias voltage forms a threshold for avoiding any premature operation of the circuit under the action of random low negative pulses having the nature of "interference." The input circuits of the control-pulses comprises two capacitors C$_{13}$ and C$_{14}$, which are charged in the rest position by the positive voltage U$_2$ via the resistors R$_{13}$ and R$_{14}$ respectively up to a voltage across capacitors C$_{13}$ and C$_{14}$ respectively which is the difference between the voltage U$_2$ and the voltage present at the junction of the voltage dividers R$_9$ and R$_{11}$, and R$_{10}$ and R$_{11}$ respectively. The normal control-pulses changing over the flip-flops consist of short-duration pulses bringing the inputs $\overline{P}$ and P for a short time at ground potential. To these inputs are furthermore connected the cathode of the semiconductor diodes D$_7$ and D$_8$, the anodes of which are connected to the points P$_7$ and P$_8$ respectively, corresponding electrically to the input electrodes of the capacitors C$_{13}$ and C$_{14}$.

The diodes D$_5$ and D$_6$, forming a crossing between point P$_7$ and the collector of the transistor T$_2$, and between the point P$_8$ and collector of the transistor T$_1$, provide the charge of the capacitors C$_{13}$ and C$_{14}$ in accordance with the instantaneous state of the flip-flop circuit. At point R there is provided an additional input for the cathode of the diode D$_{10}$, the anode of which is connected to the point P$_8$. This additional input R, when it is at ground potential, neutralises the effect of the bistable multivibrator on the control-pulses applied to the input P. These inputs are employed to form dividing counters which cause the time-base circuit B$_t$ to operate in the desired manner. The input R ensures that the flip-flop maintains a given state.

The arrangement has furthermore an input Y, which is connected to the cathode of the diode D$_9$, the anode of which is connected to point P$_4$ of the base circuit of the transistor T$_2$. This input Y serves for receiving the synchronising pulses transmitted for each new scanning period of the raster by a zero-correction device RAZ (see FIG. 5) which resets the flip-flops MVB in known manner to zero before the scan of the next raster restarts. Even in the case of disturbances during a raster scanning period it is thus ensured that the flip-flops are invariably in the zero-position at the beginning of a raster scan. The outputs Q and $\overline{Q}$ of the arrangement are directly connected to the collectors of the transistors T$_2$ and T$_1$ respectively.

Practical values of the flip-flop arrangement of FIG. 6 are given in the following table:

T1, T2=2N744   D1, D10=IN914
C5, C6=22 pf.   C13, C14=82 pf.
R1, R2=1 k$\Omega$   R3, R4=6.8 k$\Omega$   R5, R6=3.6 k$\Omega$
R7, R8, R9, R10=16 k$\Omega$   R11, R12=3.9 k$\Omega$
R13, R14=4.3 k$\Omega$
U1=+24 v.   U2=+10 v.   U3=−10 v.

FIG. 6A shows symbolically MVB of FIG. 6 in which the inputs and outputs are arranged like in the block diagram of FIG. 5. It is not necessary to use all inputs and outputs for each flipflop MVB, since in certain cases some of the flipflops are not connected.

Figure 7:
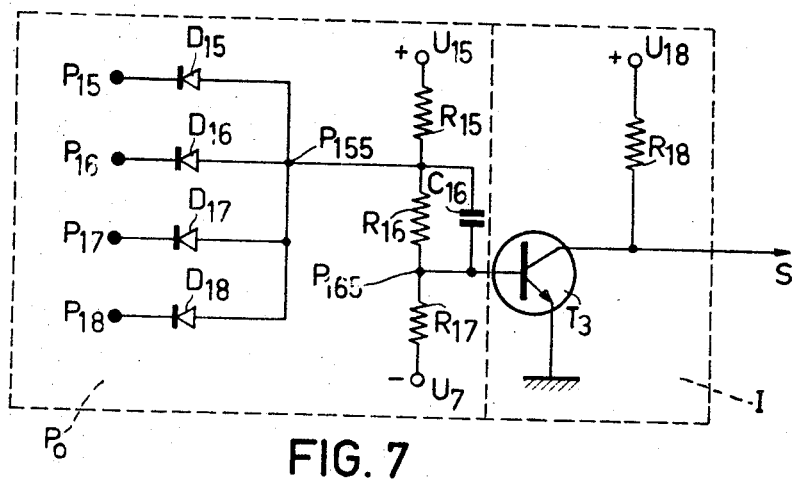

The and-gates Po are shown in conjunction with the inverting element I in FIG. 7. They are formed by the parrallel-connected diodes D$_{15}$ to D$_{18}$. The inverting element I is formed by the transistor T$_3$, the emitter of which is connected to ground. The and-gates –followed by the inverting elements I) are identical and are each a normally available part, a variable number of inputs of which is used at the place where an element is employed. If a single input is used, the gating effect is meaningless and only the inverting element I is active, but the impedances and the signal levels have to be maintained correctly. In such a case the diagram of FIG. 5 shows only the block representing the "inverting function." FIG. 7 shows the work point of the transistor T$_3$ in the rest position (in which all cathodes of the diodes D$_{15}$ to D$_{18}$ are positive to point P$_{155}$), said point being determined by the resistors R$_{15}$, R$_{16}$ and R$_{17}$, the junction P$_{165}$ of which, lying between R$_{16}$ and R$_{17}$, is connected to the base of the transistor T$_3$ and by the values of the voltages U$_{15}$ and U$_{17}$ ground. The transistor T$_3$ is fed by the voltage U$_{18}$ via the resistor R$_{18}$. The signals directly supplied by or through inverting stages by the bistable multivibrators MVB are applied to each of the input terminals P$_{15}$ to P$_{18}$, formed by the cathodes of the diodes D$_{15}$ to D$_{18}$. The capacitor C$_{16}$ serves for rapid transmission of the pulses from the junction P$_{155}$ of the anodes D$_{15}$ to D$_{18}$ to the base of the transistor T$_3$.

By way of example the values of the elements of a practical arrangement as shown in FIG. 7 are given below:

D15, D16, D17, D18=IN914
C16=22 pf.
R15=6.8 k$\Omega$   R16=3.6 k$\Omega$   R17=16 k$\Omega$
R18=1 k$\Omega$   T3=2N744   U17=−10 v.   U18=+10 v.
U15=+24 v.

Figure 8:
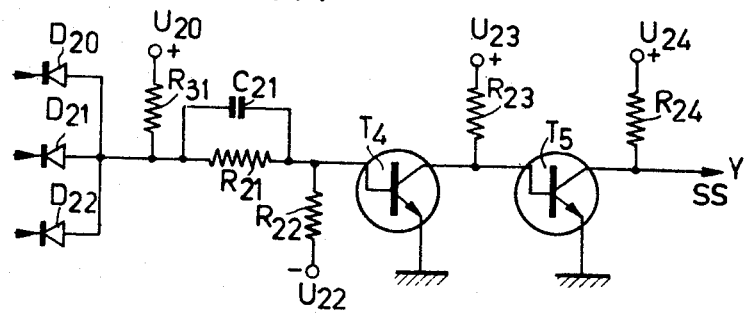

The zero-correction member RAZ is also a normally available part; only one is used in this case; it is shown in detail in FIG. 8. The construction of the input circuit is identical to that of the input circuit of an and-gate. The collector of the transistor T$_4$, which receives the voltage U$_{23}$ via a resistor R$_{23}$, is connected to the base of the transistor T$_5$, the emitter of which is directly connected to ground and the collector of which is fed via the resistor $R_{24}$ by the voltage $U_{24}$. Only a single diode of the circuit of FIG. 8 is used, and for substantially the whole synchronising period the cathode of said single semiconductor diode, to which is fed the synchronising signal (SYN), is positive with respect to the anode thereof; that is to say $+6$ V. Thus transistor $T_4$ draws current thereby cutting off transistor $T_5$, leaving the collector of transistor $T_5$ at a fairly high and positive voltage. During the 0.5 $\mu$sec. of the synchronising pulse the input signal becomes zero and the voltage of the collector of the transistor $T_5$ becomes even approximately zero; the desired control-pulse is thus fed to the inputs Y of the bistable multi-vibrators MVB.

By way of example the values of the elements empolyed in a practical embodiment of the arrangement shown in FIG. 8 are given below:

$C_{21}=22$ pf.  $D_{20}, D_{21}, D_{22}=$IN 914
$R_{31}=6.8$ k$\Omega$  $R_{21}=3.6$ k$\Omega$  $R_{22}=16$ k$\Omega$  $R_{23}=750\Omega$
$R_{24}=820\Omega$
$T_4, T_5=2$N 744  $U_{20}=+24$v.  $U_{22}=-10$v.
$U_{23}=+10$v.  $U_{24}=+10$v.

Figure 9:
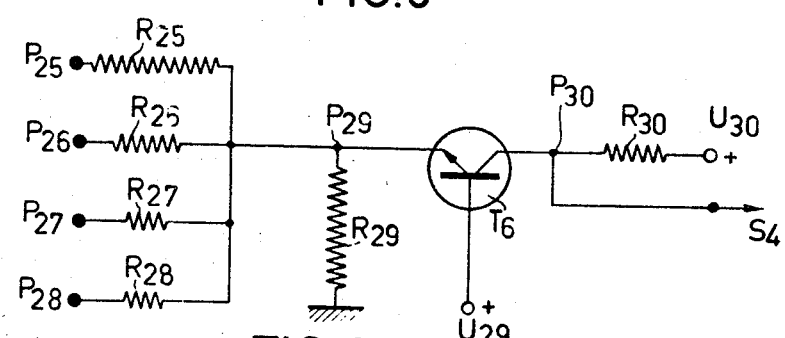

FIG. 9 shows the digital to analogue converter U of FIG. 5. The transistor $T_6$ is the active element, whose collector is is fed via the resistor $R_{30}$ by the positive voltage $U_{30}$ and whose base is connected to a fixed positive voltage $U_{29}$.

The emitter of the transistor $T_6$ is connected to point $P_{29}$ and via resistor $R_{29}$ to ground, to which is also connected the negative common terminal of the positive voltages $U_{29}$ and $U_{30}$.

The four resistors $R_{25}$ to $R_{28}$ have the values $4\rho$, $2\rho$, $1\rho$ and $1\rho$ respectively and $4\rho$ is the value of the resistor $R_{29}$.

The four inputs $P_{25}$ to $P_{28}$, forming the free ends of the resistors $R_{25}$ to $R_{28}$, the other ends of which are connected to point $P_{29}$, are connected to the corresponding points of the divide-by-12 counter $CB_{12}$.

The converter of FIG. 9 operates as follows:

At the instant 0 (at the beginning of a signal F; see also the table of commutations hereinafter) the points $P_{25}$ to $P_{28}$ are, in accordance with the corresponding points of the counter $CB_{12}$, to which they are connected, at a positive voltage approximately equal to $U_{29}$. The current through the base-emitter circuit is determined by the characteristics of the voltage divider formed by the resistor $R_{29}$ and the assembly of resistors $R_{25}$ to $R_{28}$, which are connected in parallel, and by the voltages at points $P_{25}$ to $P_{28}$. Consequently, at the instant 0 the potential differences across said voltage divider is at a minimum, so that the base-emitter current is at a minimum and also the collector current $I_o$ of the transistor $T_6$ is at a minimum.

During the operation of the multivibrators $MVB_5$ to $MVB_8$ of FIG. 5 the points of the inputs $P_{25}$ to $P_{28}$ have a voltage approximately equal to ground potential in the given order corresponding to the table below. Owing to the chosen ratio between the resistors $R_{25}$ to $R_{28}$ each potential variation at points $P_{25}$ to $P_{28}$ increases the collector current of the transistor $T_6$ by a value $\Delta i$ and after the twelfth step the current returns to the initial value $I_o$. Each potential variation at points $P_{25}$ to $P_{28}$ therefore forms one step of the signal F.

Thus a step voltage appears between the point $P_{30}$ and ground which voltage decreases progressively during the eleven steps after the initial value, the initial value being regained at the twelfth commutation. The output $S_4$, receiving thus the signal ($\theta$) of FIG. 10D, is connected to the correction stage EDC, which forms the input circuit of an amplifier, the block diagram of which is shown in FIG. 17 (it shows the current source GFC of FIG. 5 together with the vertical deflection coils $V_1$ and $V_1'$).

The values of elements used in a practical embodiment as shown in FIG. 9 are given below.

$R_{25}=4000\Omega$  $R_{26}=2000\Omega$  $R_{27}=R_{28}=1000\Omega$
$R_{29}=4000\Omega$  $R_{30}=390\Omega$  $T_6=2$N 1613
$U_{29}=+10$ v.  $U_{30}=+24$ v.

In the numerical example the various counters are relatively connected so that the output $S_1$ provides pulses ($\alpha$) of a width of 2 $\mu$sec. and intervals of 7 $\mu$sec. (FIG. 10A), the output $S_2$ a signal ($\beta$) formed by sequences of eleven pulses of 45 $\mu$sec. and intervals of 1800 $\mu$sec., followed by a twelfth pulse of 45 $\mu$sec., having an interval of 1890 $\mu$sec. from the preceding pulse and of 1710 $\mu$sec. from the first pulse of a new sequence of eleven pulses (see pulse sequence ($\beta$) of FIG. 10C), the output $S_3$ pulses Y of 2 $\mu$sec. and intervals of 43 $\mu$sec. (see FIG. 10B), the output $S_5$ pulses ($\delta$) of 45 $\mu$sec. and intervals of 1800 $\mu$sec. (FIG. 10C) and the output $S_6$ pulses ($\epsilon$) of 90 $\mu$sec. and intervals of 22,095 $\mu$sec. (FIG. 10C). The function of these signals will be explained hereinafter.

The generators $G_A$, $G_B$, $G_C$ and $G_E$ are based on the same principle for producing sawtooth signals: they comprise each a buffer capacitor $C_R$, charged by a constant current and discharged via a circuit which becomes conducting by the signals applied to the outputs $S_1$, $S_2$, $S_3$, $S_5$ and $S_6$ of the time-base circuit $B_t$.

FIG. 11 shows the block diagram of the generators $G_A$, $G_{AC}$ of FIG. 4 for the supply of a sawtooth signal like the signal A of FIG. 2Aa to the coils $H_1$, $H_1'$.

The capacitor $C_{R1}$ is charged through a charging circuit $E_C$ and discharged via two discharging stages $E_{D1}$ and $E_{D2}$. The individual strength of the discharge currents can be controlled by the variable resistors $R_{19}$ and $R_{20}$. The two discharging circuits are absolutely necessary, since the fly-back time of the beam from the last row of matrices to the first row is longer than the fly-back time from one row to the next (135 $\mu$sec. instead of 45 $\mu$sec. in this case).

This difficulty is solved in the following manner. In a normal retracing time of 45 $\mu$sec. the two discharging circuits $E_{D1}$ and $E_{D2}$ operate simultaneously in parallel, whilst the pulses of 45 $\mu$sec. from the outputs $S_2$ and $S_5$ of the time-base circuit $B_t$ coincide. After twelve steps the two circuits $E_{D1}$ and $E_{D2}$ operate one after the other. The circuit $E_{D2}$ receives first a pulse of 45 $\mu$sec. from the output $S_5$ (see signal 8 in FIG. 10C), then with a delay of 90 $\mu$sec. (equal to the difference in retracing times 90–135–45 $\mu$sec.) the circuit $E_{D1}$ receives a pulse of 45 $\mu$sec. from the output $S_2$ of the time-base circuit $B_t$ (see signal $\beta$ in FIG. 10C; of the time difference between the two first pulses of the signals $\beta$ and $\delta$).

However, the charging time of the capacitor $C_R$ should remain constant irrespective of its discharging period. The charging time determines the amplitude of the sawtooth and hence the amplitude of the beam deflection.

In order to ensure that during the longer retracing time of 135 $\mu$sec. the capacitor $C_{R1}$ does not receive further charge than during the normal retracing time of 45 $\mu$sec., a device DC interrupts the supply of charge for two-thirds of the retracing time of 135 $\mu$sec. (here 90 $\mu$sec., corresponding to the difference between the discharging times of 135 and 45 $\mu$sec.), for example by cutting off

| Order of commutations | | 0 | 1 | 2 | 3 | 4 | 5 | 6 | 7 | 8 | 9 | 10 | 11 | 12 | 13 |
|---|---|---|---|---|---|---|---|---|---|---|---|---|---|---|---|
| Points approximately at ground potential. | $P_{25}$ | | x | | x | | x | | x | | x | | x | | x |
| | $P_{26}$ | | | x | x | | | x | x | | | x | x | | |
| | $P_{27}$ | | | | | x | x | x | x | x | x | x | | | |
| | $P_{28}$ | | | | | | | | | x | x | x | x | | |
| Increase in current $I_0$ expressed in $\Delta i$ | | 0 | 1 | 2 | 3 | 4 | 5 | 6 | 7 | 8 | 9 | 10 | 11 | 0 | 1 | a charging transistor $T_7$ of the circuit EC, see FIGS. 12 and 13, by means of the signal (e) at the terminal $S_6$. Between the capacitor $C_{R1}$ and the sets of coils $H_1$ and $H_1'$ there is connected a power stage EP, having an impedance matching input circuit formed by the transistors $T_8$, $T_9$ and $T_{10}$, connected like emitter followers (see FIG. 13, which shows an embodiment of the device of FIG. 11). The collectors of the power transistors $T_{11}$ and $T_{12}$ are fed from a direct voltage source $S_{55}$ through a choke $B_{13}$. Owing to the low DC resistance of the choke in the collector circuits of the transistors $T_{11}$ and $T_{12}$ the linearity of the scan is disturbed. This can be corrected by applying a sawtooth component to the charging current of the capacitor $C_{R1}$. A correction signal generator $G_C$ may be simple formed by a transistor $T_{34}$, which forms part of the circuit described above and which supplies the required correction signal to the base of the charging transistor $T_7$.

Moreover, if the screen $E_c$ of the cathode-ray tube $T_1$ is flat, it is necessary to correct the resultant deviation from the linearity of the image by the so-called S-correction. For this purpose the charging current of the capacitor $C_{R1}$ is modulated so that the sawtooth signals A are slightly rounded off and slightly flattened at the beginning and at the end of the leading edges, the two flattened parts corresponding to the positions of the spot near the edges of the screen $E_c$. The modulation voltage should have a parabolic shape; it is applied to the collector circuit of the transistor $T_7$ by the generator $G_{DP}$, formed by two transistors $T_{13}$ and $T_{14}$, which are connected stepwise.

From FIG. 13 it will be seen that for this purpose the base of the transistor $T_7$, connected to point $P_{41}$, is governed, in addition, by the interruptor DC through the variable resistor $R_{39}$, and by the correction-voltage generator $G_{DC}$ via the resistor $R_{41}$, which connects point $P_{41}$ to the base of the transistor $T_7$. The emitter of the transistor $T_7$ receives a voltage $U_{35}$ via a fixed resistor $R_{35}$ and a variable resistor $R_{36}$, having a common junction $P_{36}$, to which is connected the parabolic correction-voltage generator $G_{DP}$, which is otherwise connected to the collector of the transistor $T_{13}$ of the part $G_{DP}$. The resistor $R_{35}$ thus forms part of the emitter circuit of transistor $T_7$ and of the collector circuit of transistor $T_{13}$, so that the coupling between said transistors is ensured.

The detailed diagram of FIG. 13 is an embodiment of the block diagram of FIG. 11. In the charging interrupter DC the emitter of the transistor $T_{33}$ receives the voltage $U_{33}$ and its base is connected to its emitter by the diode $D_{33}$, the cathode of which is connected to said emitter. The collector of the transistor $T_{33}$ is connected via the variable resistor $R_{39}$ to the base of the transistor $T_7$. The charging interrupting signal (e), the pulses of which have a duration of 90 μsec. and which emanates from the output $S_6$ of the time-base-circuit $B_t$, is applied to the cathode of the diode $D_{37}$, the anode of which receives the voltage $U_{38}$ through a resistor $R_{38}$. From the anode output of this diode the signal is transmitted to the base of the transistor $T_{33}$ via the capacitor $C_{37}$ and the resistor $R_{37}$ in series connection.

In the sawtooth correction signal generator $G_{DC}$ the emitter of the transistor $T_{34}$ receives a voltage $U_{43}$ and the base receives via the resistor $R_{32}$ the signal of the collector of the transistor $T_{35}$. The collector of the transistor $T_{34}$ is connected to ground via the resistor bridge formed by the series-connected resistors $R_{40}$ and $R_{42}$. The junction $P_{41}$ of these two resistors is partly decoupled to ground by the capacitor $C_{42}$ and is coupled with the base of the transistors $T_7$ via resistor $R_{41}$.

In the discharging stage $E_{D1}$ the collector of the transistor $T_{36}$ is connected to point $P_{48}$, the non-ground connected end of the capacitor $C_{R1}$ through the variable resistor $R_{19}$. The emitter of this transistor is fed by the voltage $U_{50}$. A diode $D_{50}$, connected between the emitter and the base, prevents the latter from becoming negative relative to the emitter. The control-signal of the stage $E_{D1}$ from the output $S_2$ of the time-base circuit $B_t$ is applied to the cathode of a diode $D_{49}$, the anode of which receives through the resistor $R_{49}$ the voltage $U_{49}$. The signal thus produced at point $P_{49}$ is transmitted to the base of the transistor $T_{36}$ through the series connection of the resistor $R_{50}$ and the capacitor $C_{50}$. The base of transistor $T_{36}$ is connected by way of diode $D_{50}$ to source $U_{50}$ of supply voltage, and the emitter of transistor $T_{36}$ is also connected to source $U_{50}$.

In the discharging stage $E_{D2}$ the collector of the transistor $T_{35}$ (point $P_{35}$) is connected via the resistor $R_{43}$ to the base of the transistor $T_{34}$ of the part $G_{DC}$ and to point $P_{48}$ via the diode $D_{35}$ and the variable resistor $R_{20}$. The emitter of the transistor $T_{35}$ receives the voltage $U_{36}$. The base of the transistor $T_{35}$ is connected to the emitter through the diode $D_{36}$, which prevents said base from becoming negative to the emitter.

The control-signal of the stage $E_{D2}$ from the output $S_5$ of the time-base circuit $B_t$ is applied to the cathode of the diode $D_{44}$, the anode of which receives the voltage $U_{44}$ via the resistor $R_{44}$. The resultant signal at point $P_{44}$ is applied to the base of the transistor $T_{35}$ through the resistor $R_{43}$ and the capacitor $C_{36}$, which are connected in series.

In the parabolic correction voltage generator $G_{DP}$ the emitter of the transistor $T_{14}$ receives the voltage $U_{45}$ through the resistor $R_{45}$ and the collector of said transistor is directly connected to the source $U_{46}$. The base of this transistor is controlled via the resistor $R_{48}$ by a voltage prevailing at point $P_{48}$. The capacitor $C_{48}$ is connected between the base of the transistor $T_{14}$ and ground and together with the resistor $R_{48}$ it forms an integrating network.

The transistor $T_{14}$ is connected like an emitter follower. The emitter is directly connected to the base of the transistor $T_{13}$, the collector of which is connected to point $P_{36}$ of the charging stage $E_C$. The emitter of the transistor $T_{13}$ is connected to ground through the series combination of resistors $R_{46}$ and $R_{47}$. The resistor $R_{47}$ is decoupled by the capacitor $C_{47}$.

In the power amplifier EP the first three transistors $T_8$, $T_9$ and $T_{10}$ are connected like "emiter followers." The collector of the transistor $T_8$ receives a voltage $U_{51}$ and its emitter receives the voltage $U_{52}$ through a resistor $R_{51}$. The base of the transistor $T_8$ receives a voltage prevailing at point $P_{48}$. The collectors of the transistors $T_9$ and $T_{10}$ receive the voltage $U_{55}$ from the source $S_{55}$ and the emitters receive the voltage $U_{53}$ through the resistors $R_{52}$ and $R_{53}$ respectively; the emitter of the transistor $T_9$ is connected to the base of the transistor $T_{10}$, whose emitter is connected to the parallel-connected base electrodes of the transistors $T_{11}$ and $T_{12}$. The collectors of the transistors $T_{11}$ and $T_{12}$ are fed in parallel connection by the voltage $U_{55}$ through the choke $B_{13}$. The emitters of the transistors $T_{11}$ and $T_{12}$ are connected to ground through the resistors $R_{54}$ and $R_{55}$ respectively. The two parallel-connected deflection coils $H_1$ and $H_1'$ are connected between ground and the collectors of the transistors $T_{11}$ and $T_{12}$ through the capacitor $C_{55}$ and are shunted by the resistor $R_{56}$.

The elements used in a practical embodiment of the arrangement shown in FIG. 13 may have the following values:

$D_{33}$–$D_{36}$–$D_{37}$–$D_{44}$–$D_{49}$–$D_{50}$=1N914
$D_{35}$ AAZ 12
$T_7$=$T_{33}$=ASY27; $T_8$=BSY38; $T_9$=2N2297; $T_{10}$=2N1886
$T_{11}$=$T_{12}$=BDY11; $T_{13}$=OC141; $T_{14}$=AF114; $T_{34}$=2N1132
$T_{35}$=$T_{36}$=ASY29
$C_{36}$–$C_{37}$–$C_{50}$=20 μf.  $C_{42}$=390 μf.  $C_{47}$=200 μf.
$C_{48}$=0.1 μf.  $C_{55}$=5000 μf.  $CR_1$=1 μf.
$R_{19}$, $R_{20}$=250Ω  $R_{35}$=820Ω  $R_{36}$=5000Ω
$R_{32}$, $R_{37}$, $R_{38}$, $R_{44}$, $R_{49}$, $R_{50}$=1000Ω  $R_{39}$=20KΩ
$R_{40}$=330Ω  $R_{41}$=15KΩ  $R_{42}$, $R_4$-=10KΩ  $R_{43}$=22KΩ
$R_{48}$=100KΩ  $R_{46}$=22Ω  $R_{47}$=470Ω  $R_{51}$=22KΩ

$R_{52}=220\Omega$  $R_{53}=15\Omega$  $R_{54}$, $R_{55}=1\Omega$  $R_{56}=200\Omega$
$B_{13}=13$ mh.
$U_{33}$, $U_{35}$, $U_{43}=+24$ v.
$U_{55}=+12$ v.
$U_{38}$, $U_{44}$, $U_{45}$, $U_{49}$, $U_{51}=+10$ v.
$U_{36}$, $U_{46}$, $U_{50}$, $U_{52}$, $U_{53}=-10$ v.

As stated above, the desired horizontal deflection is obtained by superimposing a further horizontal deflection on the deflection produced by the coils $H_1$ and $H_1'$ by means of the combination of the signals B and C, shown in FIGS. 2B and 2C respectively. Such a combination may be obtained by a device, the block diagram of which is shown in FIG. 14, and which corresponds to the device $G_B$, $G_C$ and $G_{BC}$ of FIG. 4.

A source $G_2$ (FIG. 14), comprising a transistor $T_{15}$ (see FIG. 16 the detailed arrangement) supplies a constant current which increases during each period of 45 μsec. slightly above the current capable of maintaining a constant average voltage at the terminals of the capacitor, in order to obtain across $C_{R2}$ a signal comprising said combination of signals B and C and charging said capacitor by a value depending upon the constant discharging current via the discharging stages $G_D$ and $R_{D1}$. The output of the stage $R_{D1}$ is connected to the output $S_1$ of the time-base circuit $B_t$, so that after each period of 7 μsec. for a duration of 2 μsec. the capacitor $C_{R2}$ is discharged.

Moreover the supply of charge to the capacitor $C_{R2}$ via the source $G_2$ during said 7 μsec. of charging time must exceed the discharge through the discharging stages $G_D$ and $R_{D1}$. Therefore, the voltage at the terminals of $C_{R2}$ has the waveform as shown in FIG. 15 consisting of five sawtooth waveforms. The minimum of each cycle is slightly higher than the minimum of the preceding cycle. At the instant when the discharging stage $R_{D2}$ is released by means of a pulse from the output $S_3$ of the time-base circuit $B_t$ (which pulse of 2 μsec. is delivered after every period of 43 μsec.; see signal γ of FIG. 10B), the two stages $R_{D1}$ and $R_{D2}$ are simultaneously operative, which results in a greater discharge of the capacitor $C_{R2}$ so that after 45 μsec. the total charge of $C_{R2}$ is conducted away and the capacitor returns to its initial state of charge. The variable resistor $R_{69}$, connected between point $P_{15}$ and the discharging stage $R_{D2}$, determines the value of said auxiliary discharge. The capacitor $C_{R2}$ is connected to the combination of the coils $H_2$ and $H_2'$ via the amplifying stage EA, formed by the transistor $T_{19}$, $T_{20}$ and $T_{21}$.

The waveform of the current passing through said combination is therefore similar to that shown in FIG. 15. The arrangement is constructed so that the effect of the combination $H_2$, $H_2'$ reduces that of the combination $H_1$, $H_1'$. In the detail diagram of FIG. 16 the emitter of the transistor $T_{15}$ of the part $G_2$ receives a voltage $U_{60}$ through the variable resistor $R_{60}$ and the fixed resistor $R_{61}$. The collector current of said transistor forms the charging current of the capacitor $C_{R2}$. The voltage of the base is determined by the source $U_{64}$ through the resistor $R_{64}$, with which the decoupling capacitor $C_{64}$ cooperates. The collector of the transistor $T_{15}$ is connected to the point $P_{15}$ of the capacitor $C_{R2}$.

In the stage $G_D$, discharging with a constant current, the collector of the transistor $T_{16}$ is connected to point $P_{15}$ and its base is connected to ground. The emitter of the transistor $T_{16}$ is connected through the resistor $R_{62}$ and the variable resistor $R_{63}$ to the collector of the transistor $T_{17}$ of the part $R_{D1}$.

In the part $R_{D1}$ the emitter voltage of the transistor $T_{17}$ is given by the supply $U_{67}$ and the base is connected to the cathode of a diode $D_{66}$, whose anode is connected to the emitter. The output $S_1$ of the time-base circuit $B_t$ supplies a current pulse which is applied to the cathode of the diode $D_{65}$, whose anode receives through the resistor $R_{65}$ the voltage of point $P_{64}$, which is common to the resistor $R_{64}$ and the capacitor $C_{64}$. The resultant signal at point $P_{65}$ is applied to the base of the transistor $T_{17}$ through the series-connected capacitor $C_{65}$ and the resistor $R_{66}$, which are shunted by the capacitor $C_{66}$. The collector of the transistor $T_{17}$ is connected to the emitter of the transistor $T_{16}$ through resistors $R_{62}$ and $R_{63}$.

In the part $R_{D2}$ the collector of the transistor $T_{32}$ is connected to point $P_{15}$ through the variable resistor $R_{68}$ and the variable resistor $R_{69}$. The emitter receives through resistor $R_{70}$ the voltage $U_{70}$. The resistor $R_{70}$, connected to point $P_{70}$, is decoupled to ground by the capacitor $C_{73}$. A D.C. restoring diode $D_{75}$ is connected between the emitter and the base of the transistor $T_{32}$. The control-pulse of the part $R_{D2}$ from the output $S_3$ of the time-base circuit $B_t$ is applied to the cathode of the semi-conductor diode $D_{71}$, the anode of which is fed via the resistor $R_{71}$ by the voltage $U_{71}$. The resultant signal at the anode of the diode $D_{71}$ is applied through the parallel-combination of the resistor $R_{72}$ and the capacitor $C_{72}$ to the base of the transistor $T_{18}$. The bias voltage of the base of the transistor $T_{18}$ is determined by the resistor bridge $R_{71}$, $R_{72}$, $R_{73}$ and $R_{70}$, connected between the positive voltage terminal $U_{71}$ and the negative voltage terminal $U_{70}$. The base is connected to the common point of the resistors $R_{72}$ and $R_{73}$. The collector of the transistor $T_{18}$ is fed via the resistor $R_{74}$ by the voltage $U_{74}$ and the emitter is directly connected to ground. The coupling between the collector of the transistor $T_{18}$ and the base of the transistor $T_{32}$ is provided by the resistor $R_{75}$, connected in series with the capacitor $C_{75}$, these two elements being shunted by a capacitor $C_{74}$.

In the amplifier EA the transistor $T_{19}$ is connected as an emitter follower and its collector receives a voltage from point $P_{64}$ and the emitter a voltage from $P_{70}$ through the charging resistor $R_{76}$. The base of the transistor $T_{19}$ receives directly the variable voltage of point $P_{15}$.

The emitter of the transistor $T_{19}$ is directly connected to the parallel-connected bases of transistors $T_{20}$ and $T_{21}$ and the emitters of the transistors $T_{20}$ and $T_{21}$ are connected to ground via the resistors $R_{77}$ and $R_{78}$. The two parallel-connected coils $H_2$ and $H'_2$, shunted by the variable resistor $R_{79}$, are connected between the negative terminal of the source $S_{79}$ and the parallel-connected collectors of the transistors $T_{20}$ and $T_{21}$, the positive terminal of $S_{79}$ being connected to ground.

The elements used in a practical embodiment of the arrangement shown in FIG. 16 may have the following values:
$C_{R2}=56$ nf.  $C_{64}$, $C_{73}=320$ μf.  $C_{65}=0.1$ μf.  $C_{66}$, $C_{74}=56$ pf.
$C_{72}=22$ pf.  $C_{75}=1.6$ μf.
$D_{65}$, $D_{66}$, $D_{71}$, $D_{75}=1N\,914$  $H_2$, $H'_2$ in parallel:
L=120 μh.
$R_{60}$, $R_{65}$, $R_{66}$, $R_{74}$, $R_{75}=1$ kΩ  $R_{61}=1.5$ kΩ
$R_{62}$, $R_{68}=22\Omega$  $R_{63}=470\Omega$  $R_{64}$, $R_{70}=22\Omega$  $R_{71}=6.8$ kΩ
$R_{72}=3.6$ kΩ  $R_{73}=15$ kΩ  $R_{76}=2$ kΩ  $R_{77}$, $R_{78}=33\Omega$
$T_{16}$, $T_{17}$, $T_{18}$, $T_{19}$, $T_{32}=BSY\,38$  $T_{15}=ASY\,27$
$T_{20}$, $T_{21}=2N\,2297$
$U_{60}$, $U_{71}=+24$ v.  $U_{64}$, $U_{74}=+10$ v.  $U_{67}$, $U_{70}=-10$ v.
$U_{79}=-12$ v.

As stated above, the vertical scan of the screen is obtained with the aid of two sets of coils $V_1$, $V'_1$ and $V_2$, $V'_2$.

The set $V_1$, $V'_1$ is fed by a step signal similar to the signal F (FIG. 3B). For this purpose a step signal (θ) (FIG. 10D) is applied to the source $G_{FC}$ (FIG. 4), which connects the output $S_4$ of the time-base circuit $B_t$ to the set of coils $V_1$, $V'_1$. The signal (θ) is obtained from the divide-by-12 counter $CB_{12}$ of said time-base circuit (see FIG. 5). This counter comprises three bistable flip-flops $MVB_5$, $MVB_6$ and $MVB_7$, the inputs P and $\overline{P}$ of the first $MVB_5$ are connected to the input Z of the counter and the output Q thereof is connected to the inputs P and $\overline{P}$ of the second MVB, the output Q of which is connected to the inputs P and $\overline{P}$ of the third $MVB_7$. The output Q of the latter is connected to the input $\overline{P}$ of a fourth $MVB_8$, the input P of which is connected to the output Q of $MVB_6$ and the output Q to the input R of $MVB_7$.

It has been described above how the signal ($\theta$) is obtained at the output $S_4$ of the device U.

This signal is applied to the generator $G_{FC}$ (FIG. 4 and the detailed block diagram of FIG. 17); (FIG. 19 shows a possible embodiment). This generator comprises a power stage $E_{DP}$ with transistors $T_{24}$ and $T_{25}$, preceded by an amplifier AMP with transistors $T_{22}$ and $T_{23}$. The parallel connected coils $V_1$, $V'_1$, shunted by a resistor $R_{89}$ are fed from a tapping between the sources $S_{89}$ and $S_{90}$ through an electrolytic capacitor $C_{89}$ of high value and the collector of transistor $T_{25}$. This collector receives a direct voltage through a choke $B_{88}$ of high impedance value (for example 180 mh). The choke coupling brings about a certain amount of distortion, so that the current for the transistor $T_{25}$ has to be corrected in order to obtain a uniform step current across $V_1$, $V'_1$. For the purpose an accurately step-shaped voltage supplied by the time-base circuit $B_t$ at the output $S_4$ (FIG. 18B) is applied to a correction stage $E_{DC}$, having a transistor $T_{26}$ (FIGS. 17, 18A and 19), which provides a corrected voltage (FIG. 18C). Such a correction may be simply obtained by means of an integrating network $R_{82}$, $R_{83}$, $C_{83}$ (FIG. 18A). In the detailed diagram of FIG. 19 the input $S_4$ receives the signal from the digital analogue converter U at point $P_{80}$ and the signal is applied via variable resistor $R_{80}$ to the emitter of the transistor $T_{26}$.

The potential at the base of the transistor $T_{26}$ is determined by the supply voltage $U_{85}$, which is smoothed by the capacitor $C_{85}$. The collector of the transistor $T_{26}$ receives the voltage $U_{86}$, which is smoothed by the capacitor $C_{87}$ through a composite circuit formed by two series-connected resistors $R_{82}$ and $R_{83}$, shunted by a capacitor $C_{83}$, the assembly being connected in series with the variable resistor $R_{81}$. The capacitor $C_{81}$ provides the coupling between the collector of the transistor $T_{26}$ and the base of the transistor $T_{22}$.

In the amplifier AMP the transistors $T_{22}$ and $T_{23}$ are emitter followers and the collectors thereof are fed directly by the positive voltage $U_{85}$. The mean potential at the base of the transistor $T_{22}$ is determined by the resistor bridge $R_{84}$ and $R_{85}$, the latter being variable and connected between ground and the source $U_{85}$. The emitter of the transistor $T_{22}$ is fed through the resistor $R_{86}$ by the negative voltage $U_{86}$ and is directly coupled with the base of the transistor $T_{23}$. The emitter of the transistor $T_{23}$ receives through the resistor $R_{87}$ the negative voltage $U_{86}$ and is directly connected to the base of the transistor $T_{24}$ of the amplifier $E_{DP}$.

In the part $E_{DP}$ the collector of the transistor $T_{24}$ is fed directly by the positive voltage $U_{89}$ from the source $S_{89}$ and the emitter affects directly the base of the transistor $T_{25}$. The collector of the latter is fed by way of the choke $B_{88}$ by the voltage $U_{89}$ and the emitter by the negative voltage $U_{90}$ from the source $S_{90}$ via a voltage divider formed by the two series-connected resistors $R_{88}$ and $R_{90}$. Damping resistor $R_{89}$ is connected in parallel with coils $V_1$ and $V_1'$, and these coils are decoupled to ground by a large capacitor $C_{89}$.

The current supplied to the set of coils $V_1$, $V'_1$ causes the beam to pass from one row of matrices to the next row and from the last row to the first.

The elements used in a practical arrangement as shown in FIG. 19. have the following values:

$C_{81}=10\ \mu f.$   $C_{85}, C_{87}=320\ \mu f.$   $C_{83}=8\ \mu f.$
$C_{89}=5000\ \mu f.$
$R_{80}=20\ k\Omega$   $R_{81}=10\ k\Omega$   $R_{82}=6.8\ k\Omega$   $R_{83}=8.2\ k\Omega$
CTN
$R_{84}=390\ k\Omega$   $R_{85}=220\ k\Omega$   $R_{86}=18\ k\Omega$   $R_{87}=1.2\ k\Omega$ $R_{88}=65\Omega$   $R_{89}=180\Omega$   $R_{90}=2.2\Omega$   $V_1, V'_1$, in parallel:
L=1 mh
$T_{22}$=BSY 11   $T_{12}$=2N 2297   $T_{14}$=2N 1886
$T_{25}$=BDY 10   $T_{26}$=AF114
$U_{85}=+10$ v.   $U_{86}=-10$ v.   $U_{89}=+22$ v.   $U_{90}=-10$ v.

In order to scan each column of points in one matrix a sawtooth signal E (FIG. 3) has to be applied to the output $V_2$ (FIG. 20). FIGS. 20 and 21 show a block diagram and a detailed diagram respectively of the parts $G_E$ and $G_{EC}$ of FIG. 4, which supply such a signal and which connect the output $S_1$ of the time-base circuit $B_t$, where the signal ($\alpha$) is available, to the set of coils $V_2$, $V'_2$.

In the manner described for the horizontal deflection by $H_2$, $H'_2$ a capacitor $C_{R3}$ is charged by a source $G_3$, supplying a constant current. A discharging stage $R_{D3}$ receives the signal ($\alpha$) from the time-base circuit $B_t$ and the output stage ES permits of affecting the set of coils $V_2$, $V'_2$ (FIG. 21).

During its deflection the beam is capable of scanning one column in 7 $\mu$sec. As is shown in the detailed diagram of FIG. 21 the generator $G_3$ of constant charging current for the capacitor $C_{R3}$ comprises a transistor $T_{32}$, as an active element, the emitter of which receives the positive voltage $U_{92}$ through the variable resistor $R_{92}$ and the fixed resistor $R_{93}$, which are connected in series. The base of the transistor $T_{32}$ is biased by the positive voltage $U_{94}$, which is smoothed by the capacitor $C_{94}$. The collector of this transistor is connected to point $P_{96}$, which is connected to the capacitor $C_{R3}$.

In the part $R_{D3}$ the collector of the transistor $T_{27}$ is connected to point $P_{96}$ by way of the variable resistor $R_{96}$ and the fixed resistor $R_{97}$. The emitter of said transistor is connected to a negative bias voltage source $U_{98}$ and is connected to ground by way of resistor $R_{110}$ and capacitor $C_{110}$. In order to avoid any detection effect of the signals fed to the base of the transistor $T_{27}$, this base is connected to the emitter by a semiconductor diode $D_{98}$, the cathode of which is connected to said base. The control-pulse from the output $S_1$ of the time-base circuit $B_t$ is applied to the cathode of the semiconductor diode $D_{95}$, whose anode is biased via the resistor $R_{95}$ by the positive voltage $U_{95}$. The signal produced at the anode of the diode $D_{95}$ is transmitted to the base of the transistor $T_{27}$ through a composite circuit formed by the resistor $R_{98}$ and the capacitor $C_{96}$, connected in series and shunted by a capacitor $C_{95}$.

In the amplifier ES the collector of the emitter-follower preamplifying transistor $T_{28}$ is fed by the positive voltage $U_{94}$ and the emitter by the negative voltage $U_{98}$ via the resistor $R_{99}$, while the base of said transistor is directly connected to point $P_{96}$. The emitter of the transistor $T_{28}$ directly affects the two parallel-connected bases of the transistors $T_{29}$ and $T_{30}$. The two collectors of the parallel-connected transistors $T_{29}$ and $T_{30}$ are fed through the parallel-connected coils $V_2$ and $V'_2$ by the positive voltage $U_{102}$ from the source $S_{102}$; the set of coils $V_2$ and $V'_2$ is shunted by the variable resistor $R_{102}$. The negative terminal of the source $S_{102}$ is connected to ground and the two emitters of the transistors $T_{29}$ and $T_{30}$ are connected to ground through the resistors $R_{100}$ and $R_{101}$ respectively.

The elements used in a practical embodiment of the arrangement shown in FIG. 21 have the following values:

$C_{94}=320\ \mu f.$   $C_{95}=80$ pf.   $C_{96}=0.1\ \mu f.$   $CR_3=39$ nf.
$D_{95}$=IN914
$R_{92}=560\Omega$   $R_{93}=680\Omega$   $R_{95}, R_{98}, R_{99}, R_{102}=1000\Omega$
$R_{96}=120\Omega$   $R_{97}=20\Omega$   $R_{100}, R_{101}=33\Omega$
$T_{27}, T_{28}$=BSY38   $T_{29}, T_{30}$=2N2297   $T_{32}$=ASY27
$U_{92}=+24$ v.   $U_{94}, U_{95}=+10$ v.   $U_{102}=+8$ v.
$U_{98}=-10$ v.
$V_2, V'_2$ in parallel: L=250 $\mu$h.

The modulation signals for the electron beam are transmitted every microsecond by the apparatus arranged beyond the device (for example a computer) and therefore the scanning period of a column of points allows for a safety margin of 0.5 μsec. at the beginning and at the end of the scan of one column.

The electron beam is preferably modulated by applying a pulsatory signal to the cathode of the gun $C_c$; thus the short pulses are produced in the electron beam to cause the points of the screen $E_c$ to luminesce. FIG. 22 shows an amplifier comprising a transistor $T_{31}$, which can be arranged between the computer supplying the modulation signals and the cathode K of the tube $T_i$. The brightness of the spot may be varied by means of the potentiometer $R_{108}$, connected to the Wehnelt cylinder W of said tube. As is shown in the detailed diagram of FIG. 22 the collector of the transistor $T_{31}$, forming the active element of the amplifier AV, is fed by the positive voltage $U_{104}$ through the resistor $R_{104}$, while the emitter of said transistor is connected to ground via the resistor $R_{103}$. The collector of the transistor $T_{31}$ is directly connected to the cathode K of the display tube $T_i$.

The base of the transistor $T_{31}$ is biased by the negative voltage $U_{106}$ from a voltage divider formed by the resistor $R_{105}$ and $R_{106}$. The junction EM of said resistors, which is connected to the base of the transistor $T_{31}$, is the input for the modulation signals from the computer. The voltage divider formed by the fixed resistor $R_{107}$ and the resistor $R_{108}$ supplies the bias voltage for the Wehnelt cylinder W of the display tube $T_i$ by means of the positive voltage $U_{104}$. The tapping of the potentiometer $R_{108}$, connected to the Wehnelt cylinder W, is decoupled to ground by the capacitor $C_{108}$.

The elements used in a practical embodiment of the circuitry shown in FIG. 22 have the following values:

$C_{108}=22$ nf.
$R_{103}=470\Omega$  $R_{104}=2000\Omega$  $R_{105}=100\Omega$  $R_{106}=240\Omega$
$R_{107}=270$ kΩ
$R_{108}=500$ kΩ
$T_{31}=$BF 109
$U_{104}=+130$ volts  $U_{106}=-10$ volts As a matter of course, variants of the embodiments described above are possible within the scope of the present invention.

What is claimed is:

1. In a device for displaying information on the screen of a cathode-ray tube, wherein said information is comprised of symbols that are each formed by a characteristic sequence of electric modulation signals supplied from a source of signals connected so that the symbols are rendered visible by the intensity modulation of the electron beam of said tube produced by said signals, so that given points of a matrix of points forming each symbol are caused to luminesce, said points in each said matrix being arranged in lines arranged one above the other, said matrices being arranged in at least one row, and wherein said electron beam scans each column of points of each matrix in order of succession, the improvement comprising a source of a first sawtooth signal having an amplitude which corresponds to one row of matrices and a tracing time which corresponds to the time required by the electron beam to scan all matrices of one row, a source of a second sawtooth signal having an amplitude which corresponds to the number of intervals adjacent between two columns in one matrix and of the intervals between two consecutive matrices of the same row, and a tracing time which corresponds to the time required by the electron beam to scan one matrix, a source of a third sawtooth signal having an amplitude which corresponds to the intervals between two columns of points of one matrix and a tracing time which corresponds to the time required for scanning one column of points, the retracing times of the second signal and of the third signal being equal to each other and corresponding to the interval between two consecutive columns of points of one matrix, the front edges of the second signal and of the third signal being such that their sum is equal to and opposite the leading edge of the first signal, deflection means for said tube, means applying said first, second and third signals to said deflection means for deflecting said beam in a horizontal direction, and a source of a vertical sawtooth signal connected to said deflection means for deflecting said beam in a vertical direction, the amplitude of said vertical sawtooth signal corresponding to the scan of one column of points of a matrix and the tracing time of said vertical sawtooth signal corresponding to the time required by the electron beam to scan one column of points, the retracing time of said vertical sawtooth signal corresponding to the interval between two consecutive columns and between two consecutive matrices of one row, said vertical sawtooth signal having the same repetition frequency and the same phase as the third sawtooth signal of the horizontal scan.

2. A device as claimed in claim 1, wherein the electron beam scans different rows, comprising a source of a vertical step signal formed by a current of stepwise waveform, the height of the steps of said step signal being equal to the linear array in one matrix, and the width of a step being equal to the time required by the electron beam to scan all matrices of one row plus the time of the interval between two consecutive rows or the time interval between the last row and the first one and means applying said vertical step signal to said deflection means for deflecting said beam in a vertical direction.

3. A device as claimed in claim 2, wherein the retracing time of the first sawtooth signal applied to the deflection means is equal to the time required for the electron beam to change over from one row of matrices to the next.

4. A device as claimed in claim 2, wherein said deflecting means comprises two sets of two coils each for vertical deflection.

5. A device as claimed in claim 4, comprising means applying the vertical sawtooth signal to the first set of said two coils, and means applying said step signal to the second set of two coils.

6. A device as claimed in claim 5, wherein said source of step signal comprises a time-base circuit, said time base circuit including an analogue converter unit which comprises a transistor, the emitter circuit of which includes parallel-connected resistors, whose values are multiples of the value of one of them, a plurality of bistable flip-flop circuits operating as counters, and means connecting each said resistor to one of said flip-flop circuits.

7. A device as claimed in claim 6, comprising transistor means connected to apply the step signal to said second set of coils, choke means for connecting the collector of said transistor means to a direct-voltage source, said second set of coils being connected between said transistor means and the choke means, and further comprising an integrating network of a resistor and a capacitor connected between the time-base circuit and the transistor means.

8. A device as claimed in claim 1, wherein said deflection means comprises a magnetically operated horizontal deflection member and said deflection member comprises two sets of two coils each.

9. A device as claimed in claim 8, comprising means applying the first sawtooth signal to the first set of two coils and means applying the second and third sawtooth signals to the second set of two coils.

10. A device as claimed in claim 1, wherein said sources of sawtooth signals for the horizontal and vertical deflections of the electron beams each comprise a buffer capacitor, constant current means for charging said capacitor, and discharging circuit means connected to discharge said capacitor.

11. A device as claimed in claim 10, comprising a source of signals consisting of square-wave pulses, the duration of which corresponds to the discharging time of said buffer capacitors, and means applying said last mentioned signals to said discharging circuits for controlling the discharge of said capacitors.

12. A device as claimed in claim 11, wherein said source of square-wave pulses comprises a single timebase circuit, which is controlled by a first signal including square-wave pulses supplied by said source which furnishes the modulation signals for the electron beam.

13. A device as claimed in claim 12, wherein the timebase circuit is formed by an assembly of bistable flipflop circuits and counters having different denominators.

14. A device as claimed in claim 1, wherein the source of said first sawtooth signal for the horizontal deflection comprises two parallel-connected discharging circuits, comprising means for operating said discharge circuits simultaneously when the electron beam passes from one row of matrices to the other and for operating said discharge circuits sequentially when the electron beam passes over from the last matrix of the last row to the first matrix of the first row.

15. A device as claimed in claim 14, wherein said source of said first sawtooth signal comprises a buffer capacitor, comprising means for charging said capacitor at a constant rate irrespective of the discharging time, said means comprising a time-base circuit for producing a pulse having a duration equal to the difference between the time in which the electron beam passes over from the last row of matrices to the first and the time in which it passes over from one row to the next following row, and means applying said pulse to said charging means when said discharging circuits operate sequentially.

16. A device as claimed in claim 14, wherein said deflection means comprises a set of coils, comprising power transistor means connected to apply said first sawtooth signal to said coils, and choke means connected to the collectors of said transistor means, and means applying a sawtooth current component to the charging current of the buffer capacitor of said source of said first sawtooth signal.

17. A device as claimed in claim 1, wherein the screen of the display tube is flat, comprising means for modulating and deflecting the first sawtooth signal near the ends of the leading edges.

References Cited
UNITED STATES PATENTS

| | | | |
|---|---|---|---|
| 3,307,156 | 2/1967 | Durr | 340—324 |
| 3,346,853 | 10/1967 | Koster | 340—324 |

RODNEY D. BENNETT, JR., *Primary Examiner.*

T. H. TUBBESING, *Assistant Examiner.*

U.S. Cl. X.R.

315—24, 26; 340—324

UNITED STATES PATENT AND TRADEMARK OFFICE
CERTIFICATE OF CORRECTION

PATENT NO. : 3,449,620
DATED : June 10, 1969
INVENTOR(S) : JEAN CARON ET AL

It is certified that error appears in the above-identified patent and that said Letters Patent are hereby corrected as shown below:

Column 1, line 24, after "row" should be --of--;

line 38, before "the" should be --to--;

Column 2, line 6, "of" should be --for--;

Column 8, line 51, before "ground" should be --to--;

Column 12, line 70, "390 µf" to read -- 390 nf --.

line 74, after "$R_4$-" should be --$R_{45}$--;

Column 14, line 75 "MBV" should be --$MBV_6$--;

Column 16, line 5, "$T_{12}$" should be --$T_{23}$--, and

"$T_{14}$" should be --$T_{24}$--.

Signed and Sealed this

Twenty-sixth Day of April 1977

[SEAL]

Attest:

RUTH C. MASON
*Attesting Officer*

C. MARSHALL DANN
*Commissioner of Patents and Trademarks*